US010073973B2

(12) United States Patent
Yamamoto et al.

(10) Patent No.: US 10,073,973 B2
(45) Date of Patent: Sep. 11, 2018

(54) PROCESS TESTING APPARATUS, COMPUTER-READABLE MEDIUM, AND PROCESS TESTING METHOD

(71) Applicant: MITSUBISHI ELECTRIC CORPORATION, Tokyo (JP)

(72) Inventors: Takumi Yamamoto, Tokyo (JP); Kiyoto Kawauchi, Tokyo (JP); Shoji Sakurai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 143 days.

(21) Appl. No.: 15/024,649

(22) PCT Filed: Sep. 25, 2013

(86) PCT No.: PCT/JP2013/075945

§ 371 (c)(1),
(2) Date: Mar. 24, 2016

(87) PCT Pub. No.: WO2015/045043

PCT Pub. Date: Apr. 2, 2015

(65) Prior Publication Data

US 2016/0224791 A1 Aug. 4, 2016

(51) Int. Cl.

*G06F 21/56* (2013.01)
*G06F 21/53* (2013.01)

(Continued)

(52) U.S. Cl.

CPC ............ *G06F 21/566* (2013.01); *G06F 21/53* (2013.01); *G06F 21/54* (2013.01); *G06F 21/56* (2013.01);

(Continued)

(58) Field of Classification Search

CPC ...................................................... G06F 21/56
See application file for complete search history.

(56) References Cited

U.S. PATENT DOCUMENTS 8,176,558 B2 5/2012 Kuwamura
8,453,206 B2 5/2013 Haga et al.

(Continued)

FOREIGN PATENT DOCUMENTS

JP 9-114656 A 5/1997
JP 2006-011692 A 1/2006

(Continued)

OTHER PUBLICATIONS

Santos et al., "Idea: Opcode-sequence-based Malware Detection", 10 pages (Year: 2010).*

(Continued)

*Primary Examiner* — Thaddeus J Plecha
(74) *Attorney, Agent, or Firm* — Birch, Stewart, Kolasch & Birch, LLP

(57) ABSTRACT

A test memory extracting unit 110 extracts a test memory image 191 from a memory area of a target system. A template memory extracting unit 120 extracts a template memory image 192 from a template system not infected with malware. An injected code detecting unit 130 compares the test memory image 191 with the template memory image 192, and generates an injected code list 193. An injected code testing unit 140 generates a malicious code list 195 based on the injected code list 193 and a test rule list 194. A test result output unit 150 generates a test result file 196 based on the malicious code list 195.

10 Claims, 22 Drawing Sheets

(51) Int. Cl.
*G06F 21/54* (2013.01)
*G06F 21/60* (2013.01)

(52) U.S. Cl.
CPC ........ *G06F 21/60* (2013.01); *G06F 2221/033* (2013.01); *G06F 2221/2101* (2013.01)

(56) References Cited

U.S. PATENT DOCUMENTS

| | | | | |
|---|---|---|---|---|
| 8,464,345 | B2 | 6/2013 | Satish et al. | |
| 8,612,995 | B1 * | 12/2013 | Yun | G06F 13/00 719/313 |
| 8,935,530 | B2 | 1/2015 | Hashimoto et al. | |
| 8,990,944 | B1 * | 3/2015 | Singh | G06F 21/56 726/24 |
| 2007/0168694 | A1 * | 7/2007 | Maddaloni | G06F 21/56 714/4.1 |
| 2009/0133126 | A1 | 5/2009 | Jang et al. | |
| 2010/0043073 | A1 | 2/2010 | Kuwamura | |
| 2010/0077479 | A1 * | 3/2010 | Viljoen | G06F 21/56 726/23 |
| 2010/0162352 | A1 | 6/2010 | Haga et al. | |
| 2010/0262584 | A1 * | 10/2010 | Turbin | G06F 21/564 707/674 |
| 2011/0185417 | A1 * | 7/2011 | Zhou | G06F 21/566 726/22 |
| 2011/0271341 | A1 | 11/2011 | Satish et al. | |
| 2011/0277033 | A1 * | 11/2011 | Ramchetty | G06F 21/564 726/24 |
| 2013/0073851 | A1 | 3/2013 | Hashimoto et al. | |
| 2013/0111591 | A1 * | 5/2013 | Topan | G06F 21/563 726/24 |
| 2013/0198841 | A1 * | 8/2013 | Poulson | G06F 21/51 726/23 |

FOREIGN PATENT DOCUMENTS

| | | | |
|---|---|---|---|
| JP | 2006-053787 | A | 2/2006 |
| JP | 2006-106956 | A | 4/2006 |
| JP | 2008-021274 | A | 1/2008 |
| JP | 2008-052637 | A | 3/2008 |
| JP | 2009-129451 | A | 6/2009 |
| JP | 2010-009323 | A | 1/2010 |
| JP | 2010-044613 | A | 2/2010 |
| JP | 2010-049627 | A | 3/2010 |
| JP | 2010-055318 | A | 3/2010 |
| JP | 2011-048851 | A | 3/2011 |
| JP | 2012-185535 | A | 9/2012 |
| JP | 2013-089053 | A | 4/2013 |
| JP | 2013-529335 | A | 7/2013 |
| WO | WO 2008/056700 | A1 | 5/2008 |

OTHER PUBLICATIONS

Shabtai et al., “Detecting unknown malicious code by applying classification techniques on OpCode patterns”, 22 pages (Year: 2012).*

Horiai et al., “Automatic Malware Variant Classification by Hamming Distance.”, IPSJ SIG Technical Report, Issue 2008-CSEC-41, May 15, 2008, pp. 61-66.

Linn et al., “Protecting Against Unexpected System Calls”, SSYM’05 Proceedings of the 14th conference on USENIX Security Symposium, vol. 14, 2005, 16 pages.

Wagner et al., “Intrusion Detection via Static Analysis”, 2001 IEEE Symposium on Security and Privacy, S&P 2001, 2001, pp. 156-168.

* cited by examiner

Fig. 5

103: EXECUTABLE FILE INFORMATION

| NAME | PATH | VERSION | MESSAGE DIGEST | OTHERS |
|---|---|---|---|---|
| calc. exe | C:¥WINDOWS ¥system32 ¥calc. exe | 5. 1. 2600. 0 | 6380C2A9693 3F4D82E9D92 FF9AF9303A | |

Fig. 6

103: EXECUTABLE FILE INFORMATION

| NAME | PATH | VERSION | MESSAGE DIGEST | OTHERS |
|---|---|---|---|---|
| svchost . exe | C:¥WINDOWS ¥system32 ¥svchost. exe | 5. 1. 2600. 0 | A78124268A7 7F41902DB18 F622AFE613 | |
| rpcss. dll | C:¥WINDOWS ¥system32 ¥rpcss. dll | 5. 1. 2600. 5755 | F0F478D5706 58321936945 D0950AAC7F | Dcom Launch |
| termsrv . dll | C:¥WINDOWS ¥system32 ¥termsrv. dll | 5. 1. 2600. 5512 | A2D28BD95D DE7225077D D24C5554E814 | Term Service |

Fig. 9

104: INSTALL LIST

| NAME | PATH | VERSION | MESSAGE DIGEST | OTHERS |
|---|---|---|---|---|
| calc. exe | C:¥WINDOWS ¥system32 ¥calc. exe | 5. 1. 2600. 0 | 6380C2A9693 3F4D82E9D92 FF9AF9303A | |
| notepad . exe | C:¥WINDOWS ¥notepad. exe | 5. 1. 2600. 55 12 | 4460D79C0E1 48B4B02DE4 C7F09EE207E | |
| explorer . exe | C:¥WINDOWS ¥explorer. exe | 6. 00. 2900. 5 512 | CC3EF17C14 D108E121829 75C509556F3 | |
| user32 . dll | C:¥WINDOWS ¥user32. dll | 5. 1. 2600. 55 12 | BBF207C8C8 1BA58F5C2C 8B7D8492169E | |
| kernel32 . dll | C:¥WINDOWS ¥kernel32. dll | 5. 1. 2600. 62 93 | 5534D594CCF 30A9F779A44 A2184F73BF | |
| … | … | … | … | … |

Fig. 10

104: INSTALL LIST

| NAME | PATH | VERSION | MESSAGE DIGEST | OTHERS |
|---|---|---|---|---|
| calc. exe | C:¥WINDOWS ¥system32 ¥calc. exe | 5. 1. 2500. 0 | 3380C2A9696 2F4D82E9D93 AF9AF9303F | |
| notepad . exe | C:¥WINDOWS ¥notepad. exe | 5. 1. 2600 . 5512 | 4460D79C0E1 48B4B02DE4 C7F09EE207E | |
| explorer . exe | C:¥WINDOWS ¥explorer. exe | 6. 00. 2900 . 5512 | CC3EF17C14 D108E121829 75C509556F3 | |
| user32 . dll | C:¥WINDOWS ¥user32. dll | 5. 1. 2600 . 5512 | BBF207C8C8 1BA58F5C2C 8B7D8492169E | |
| kernel32 . dll | C:¥WINDOWS ¥kernel32. dll | 5. 1. 2600 . 6293 | 5534D594CCF 30A9F779A44 A2184F73BF | |
| ... | ... | ... | ... | ... |

Fig. 13

139: ADDRESS LIST

| ADDRESS | CODE |
|---|---|
| 4920B4 | 55 |
| 4920B5 | 8B |
| 4920B6 | EC |
| 4920B7 | 51 |
| 4920B8 | 53 |

Fig. 14

193S: INJECTED CODE LIST

| BLOCK NUMBER | START ADDRESS | SIZE |
|---|---|---|
| 1 | 0x 4920B4 | 0x0005 |

Fig. 16

138: PAIR LIST

| BLOCK NUMBER OF EXECUTABLE BLOCK Ba | BLOCK NUMBER OF EXECUTABLE BLOCK Bb | DISTANCE D |
|---|---|---|
| Ba1 | Bb2 | 100 |
| Ba2 | Bb3 | 200 |
| Ba3 | Bb4 | 150 |

Fig. 17

193D: INJECTED CODE LIST

| BLOCK NUMBER | START ADDRESS | SIZE |
|---|---|---|
| Ba4 | 0x72000000 | 0x4000 |

Fig. 18

194: TEST RULE LIST

| RULE NUMBER | TEST RULE |
|---|---|
| 1 | RULE (1) AND RULE (2) AND RULE (3) |
| . . . | . . . |

Fig. 19

195: MALICIOUS CODE LIST

| CODE NUMBER | START ADDRESS | SIZE | RULE NUMBER |
|---|---|---|---|
| 1 | 0x72000000 | 0x4000 | 1 |
| . . . | . . . | . . . | . . . |

Fig. 22

169: EXECUTABLE FILE LIST

| NAME | PATH | VERSION | MESSAGE DIGEST | OTHERS |
|---|---|---|---|---|
| calc. exe | C:¥WINDOWS ¥system32 ¥calc. exe | 5. 1. 2600. 0 | 6380C2A9693 3F4D82E9D92 FF9AF9303A | |
| notepad . exe | C:¥WINDOWS ¥notepad. exe | 5. 1. 2600 . 5512 | 4460D79C0E1 48B4B02DE4 C7F09EE207E | |
| explorer . exe | C:¥WINDOWS ¥explorer. exe | 6. 00. 2900 . 5512 | CC3EF17C14 D108E121829 75C509556F3 | |
| user32 . dll | C:¥WINDOWS ¥user32. dll | 5. 1. 2600 . 5512 | BBF207C8C8 1BA58F5C2C 8B7D8492169E | |
| kernel32 . dll | C:¥WINDOWS ¥kernel32. dll | 5. 1. 2600 . 6293 | 5534D594CCF 30A9F779A44A 2184F73BF | |
| ... | ... | ... | ... | ... |

PROCESS TESTING APPARATUS, COMPUTER-READABLE MEDIUM, AND PROCESS TESTING METHOD

TECHNICAL FIELD

The present invention relates to a technique for testing a memory area reserved for a process for executing an executable file.

BACKGROUND ART

There have been many security accidents (incidents) in which confidential information in a company is transmitted from a computer in the company to an outside computer by a malicious program called malware, such a virus or a Trojan horse.

To detect malware promptly, many companies have adopted anti-virus software provided by an anti-virus vendor.

Measures for preventing malware infection and leakage of confidential information by checking that a malicious program or confidential information is not included in communication data have also been adopted.

However, anti-virus software detects malware based on a known pattern of program codes included in the malware, and thus cannot detect packed malware, that is, compressed or encrypted malware.

In a case where malware encrypts communication data, it is difficult to detect communication data which includes data generated by the malware or confidential information stored in a computer.

Further, many types of malware masquerade as a legitimate program to avoid prompt detection.

For example, masquerading methods include (a) a method in which an executable file name of a legitimate program is used, (b) a method in which an executable file of a legitimate program is replaced with an executable file of a malicious program, and (c) a method in which a memory area for a process of a legitimate program is used. A memory area for a process will hereinafter be referred to simply as a "memory area".

On the other hand, there is a conventional technique for detecting malware.

In this conventional technique, static information of a legitimate program is registered in advance, and static information of a test target program is compared with the registered static information so as to determine whether or not the test target program is malware. The static information includes information about an API (Application Programming Interface) and a DLL (Dynamic Link Library) and information such as a program size and a hash value of a program code. These pieces of static information are stored on a hard disk.

However, this conventional technique can detect malware masquerading as a legitimate program by the above method (a) or (b), but cannot detect malware masquerading as a legitimate program by the above method (c). This is because, in the case of the above method (c), the static information stored on the hard disk is not altered, and thus the static information stored on the hard disk matches the static information of the legitimate program.

There is a conventional technique that is capable of dealing with the above method (c).

In this conventional technique, APIs and DLLs used by a process of a legitimate program are registered in advance, and APIs and DLLs used by a process of a test target program are compared with the registered APIs and DLLs so as to determine whether or not the test target program is malware.

However, this conventional technique can detect malware that dynamically uses APIs and DLLs which are different from those of the legitimate program, but cannot detect malware that dynamically uses the same APIs and DLLs as those of the legitimate program.

In addition, there is a conventional technique as described below.

In this conventional technique, program codes stored in a memory area for a process of a legitimate program are registered in advance, and program codes stored in a memory area of a test target program are compared with the registered program codes so as to detect a malicious program code injected by malware in the memory area of the test target program. A malicious program code injected by malware in a memory area will hereinafter be referred to as a "malicious code".

However, if a malicious code is injected in a memory area reserved dynamically (to be hereinafter referred to as a "dynamic memory area"), the conventional technique cannot detect this malicious code. This is because addresses of a dynamic memory area vary each time the memory area is reserved and it is therefore not possible to identify dynamic memory areas and compare the dynamic memory areas.

There is also a legitimate program for dynamically rewriting program codes (Just In Time Compiler). Thus, when program codes stored in memory areas are compared, a malicious code may be detected erroneously.

To promptly report what damage has been caused by a security accident caused by malware, a malware analyst is required to promptly identify a malicious code injected in a memory area and analyze which function the identified malicious code has.

In many conventional techniques, it is necessary to provide, in advance, a template for a legitimate program (or its process) listing its static information and dynamic information (APIs and DLLs used by the process).

CITATION LIST

Patent Literature

Patent Literature 1: JP 2008-21274 A

Non-Patent Literature

Non-Patent Literature 1: C. M. Linn, M. Rajagopalan, S. Baker, C. Collberg, S. K. Debray, J. H. Hartman, "Protecting Against Unexpected System Calls", Proceedings of the 2005 Usenix Security Conference, August 2005

Non-Patent Literature 2: David Wagner, Drew Dean, Intrusion detection via static analysis, Proceedings of 2001 IEEE Symposium on Security and Privacy.

SUMMARY OF INVENTION

Technical Problem

It is an object of the present invention, for example, to make it possible to detect a program code that may have been generated by malware in a memory area (an injected code).

Solution to Problem

A process testing apparatus according to the present invention includes:

a first memory image obtaining unit to obtain a first memory image representing content of a first memory area out of a memory area of a first computer that executes an executable file, the first memory area being reserved for a first process for executing the executable file;

a second memory image obtaining unit to cause a second computer, which is not infected with malware that generates a malicious program code, to execute the executable file, and obtain a second memory image representing content of a second memory area out of a memory area of the second computer, the second memory area being reserved for a second process for executing the executable file; and an injected code detecting unit to detect an injected code which is a program code included in the first memory area but not included in the second memory area, based on the first memory image and the second memory image.

Advantageous Effects of Invention

According to the present invention, for example, it is possible to detect a program code that may have been generated by malware in a memory area (an injected code).

BRIEF DESCRIPTION OF DRAWINGS

FIG. 5 is a diagram illustrating an example of executable file information 103 according to the first embodiment;

FIG. 6 is a diagram illustrating an example of the executable file information 103 according to the first embodiment;

FIG. 9 is a diagram illustrating an example of an install list 104 according to the first embodiment;

FIG. 10 is a diagram illustrating an example of the install list 104 according to the first embodiment;

FIG. 13 is a diagram illustrating an example of an address list 139 according to the first embodiment;

FIG. 14 is a diagram illustrating an example of an injected code list 193S according to the first embodiment;

FIG. 16 is an example of a pair list 138 according to the first embodiment;

FIG. 17 is a diagram illustrating an example of an injected code list 193D according to the first embodiment;

FIG. 18 is a diagram illustrating an example of a test rule list 194 according to the first embodiment;

FIG. 19 is a diagram illustrating an example of a malicious code list 195 according to the first embodiment;

FIG. 22 is a diagram illustrating an example of an executable file list 169 according to the first embodiment;

DESCRIPTION OF EMBODIMENTS

First Embodiment

An embodiment for detecting a malicious program code generated by malware in a memory area will be described.

Figure 1:
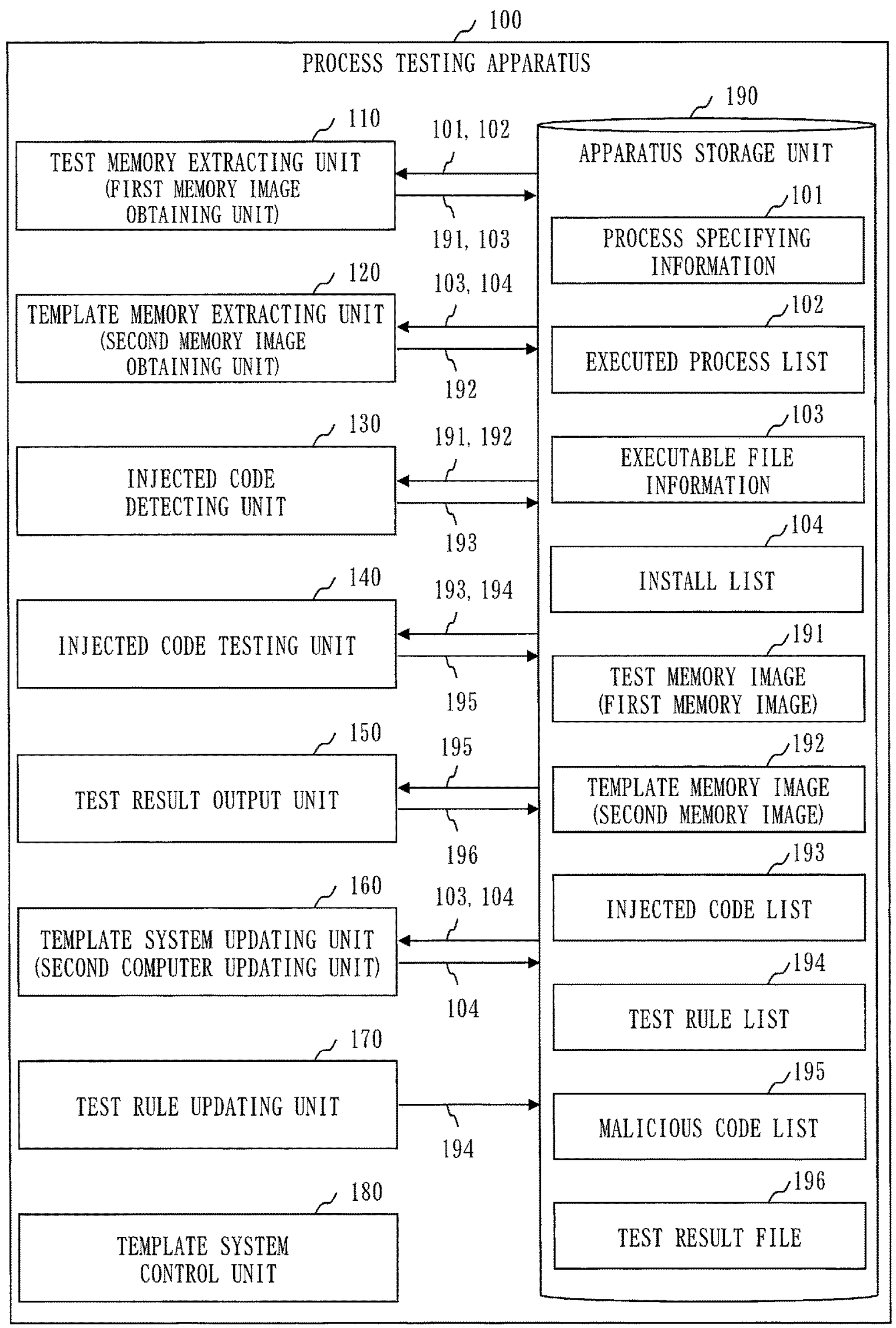
FIG. 1 is a functional configuration diagram of a process testing apparatus 100 according to a first embodiment.

FIG. 1 is a functional configuration diagram of a process testing apparatus 100 according to a first embodiment.

With reference to FIG. 1, the functional configuration of the process testing apparatus 100 according to the first embodiment will be described.

The process testing apparatus 100 is a computer that detects a malicious program code generated by malware in a memory area.

The process testing apparatus 100 includes a test memory extracting unit 110 (an example of a first memory image obtaining unit), a template memory extracting unit 120 (an example of a second memory image obtaining unit), an injected code detecting unit 130, and an injected code testing unit 140.

The process testing apparatus 100 includes a test result output unit 150, a template system updating unit 160 (an example of a second computer updating unit), a test rule updating unit 170, a template system control unit 180, and an apparatus storage unit 190.

The apparatus storage unit 190 will be described first.

The apparatus storage unit 190 stores data used or generated by the process testing apparatus 100.

For example, the apparatus storage unit 190 stores the following data.

Process specifying information 101 is information that is specified for identifying a process to be tested among processes being executed by a computer (or computer system) to be tested.

The computer (or computer system) to be tested will hereinafter be referred to as a "target system". The process to be tested will be referred to as a "target process".

An executed process list 102 is a list of processes being executed by the target system to be tested.

Executable file information 103 is information indicating an executable file from which the target process originates. An executable file is a program in an executable form.

The executable file from which the target process originates will hereinafter be referred to as a "target executable file". The target executable file is executed using hardware resources (CPU, memory area, etc.) allocated to the target process. The target process is generated by an OS (Operating System) when the target executable file is executed.

An install list 104 is a list of executable files installed on a computer (or computer system) not infected with malware.

The computer (or computer system) not infected with malware will hereinafter be referred to as a "template system".

A test memory image 191 (an example of a first memory image) is data representing the content of a memory area reserved for the target process out of a memory area of the target system (an example of a first computer).

A template memory image 192 (an example of a second memory image) is data representing the content of a memory area reserved for a process corresponding to the target process out of a memory area of the template system (an example of a second computer).

The process corresponding to the target process is a process for executing the target executable file among processes being executed by the template system.

An injected code list 193 is a list of information for identifying a program code included in the memory area represented by the test memory image 191, but not included in the memory area represented by the template memory image 192 (to be hereinafter referred to as an injected code).

A test rule list 194 is a list of test rules.

A test rule is a rule to be met by a malicious program code generated by malware in a memory area (to be hereinafter referred to as a malicious code).

A malicious code list 195 is a list of malicious codes.

The functional configuration other than the apparatus storage unit 190 will now be described.

The test memory extracting unit 110 generates the test memory image 191 and the executable file information 103 based on the process specifying information 101 and the executed process list 102.

The template memory extracting unit 120 generates the template memory image 192 based on the executable file information 103 and the install list 104.

The injected code detecting unit 130 generates the injected code list 193 based on the test memory image 191 and the template memory image 192.

The injected code testing unit 140 generates the malicious code list 195 based on the injected code list 193 and the test rule list 194.

The test result output unit 150 generates a test result file 196 based on the malicious code list 195.

The template system updating unit 160 operates on a regular basis as described below.

The template system updating unit 160 identifies an executable file installed on the target system, but not installed on the template system, based on the executable file information 103 and the install list 104.

The template system updating unit 160 installs the identified executable file on the template system and updates the install list 104.

The test rule updating unit 170 updates the test rule list 194 as specified by a user.

The template system control unit 180 causes a virtual machine that functions as the template system to operate.

The process testing apparatus 100 is a computer that functions as the target system and the template system, and also tests the target process of the target system.

Figure 2:
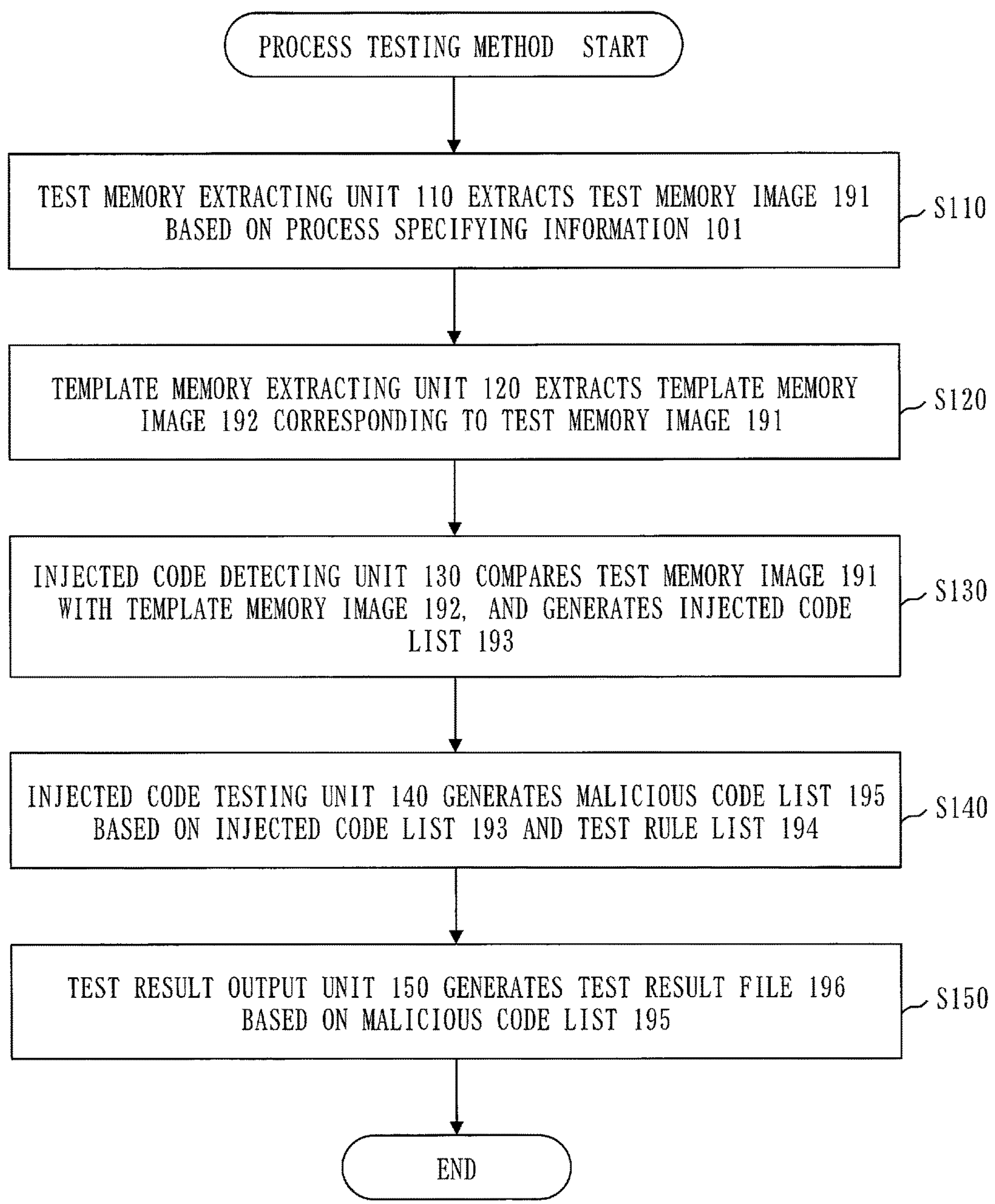
FIG. 2 is a flowchart illustrating a process testing method according to the first embodiment.

FIG. 2 is a flowchart illustrating a process testing method according to the first embodiment.

With reference to FIG. 2, the process testing method according to the first embodiment will be described.

First, the process testing method will be described in outline.

The test memory extracting unit 110 extracts the test memory image 191 from a memory of the target system based on the process specifying information 101 (S110).

The template memory extracting unit 120 extracts the template memory image 192 corresponding to the test memory image 191 from the template system (S120).

The injected code detecting unit 130 compares the test memory image 191 with the template memory image 192, and generates the injected code list 193 (S130).

The injected code testing unit 140 generates the malicious code list 195 based on the injected code list 193 and the test rule list 194 (S140).

The test result output unit 150 generates the test result file 196 based on the malicious code list 195 (S150).

Next, the process testing method will be described in detail.

In S110, the user inputs the process specifying information 101 to the process testing apparatus 100.

The test memory extracting unit 110 extracts the test memory image 191 from the memory of the target system based on the process specifying information 101.

After S110, processing proceeds to S120.

Test memory extraction processing (S110) by the test memory extracting unit 110 will be described in detail below.

Figure 3:
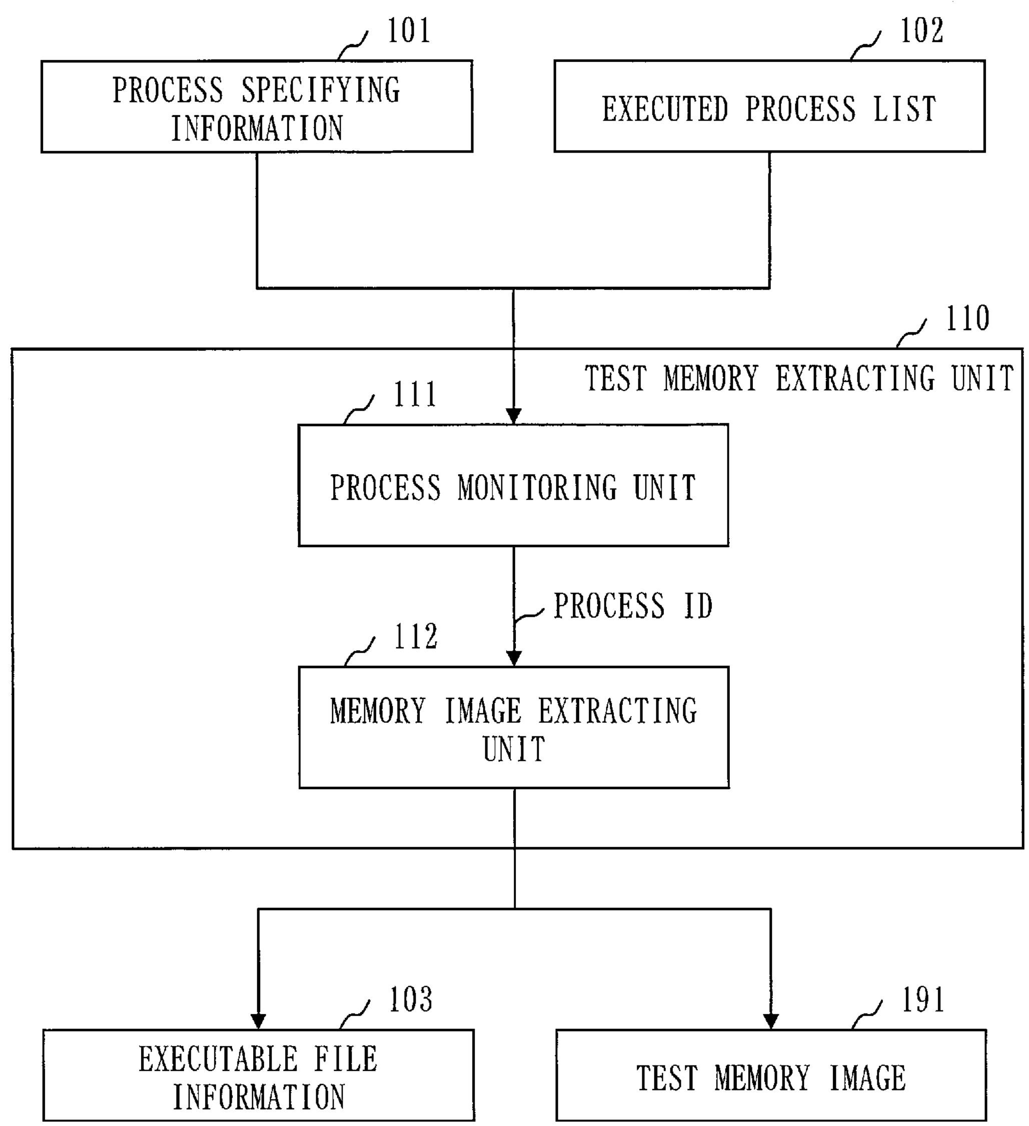
FIG. 3 is a functional configuration diagram of a test memory extracting unit 110 according to the first embodiment.

FIG. 3 is a functional configuration diagram of the test memory extracting unit 110 according to the first embodiment.

As illustrated in FIG. 3, the test memory extracting unit 110 includes a process monitoring unit 111 and a memory image extracting unit 112.

The process monitoring unit 111 identifies a process ID of the target process based on the process specifying information 101 and the executed process list 102. A process ID is an example of an identifier for identifying a process. For example, a process ID may be replaced with a process name. The process monitoring unit 111 may identify the process ID of the target process without using the executed process list 102.

The memory image extracting unit 112 extracts the test memory image 191 from the memory of the target system based on the process ID identified by the process monitoring unit 111. The memory image extracting unit 112 also generates the executable file information 103.

Figure 4:
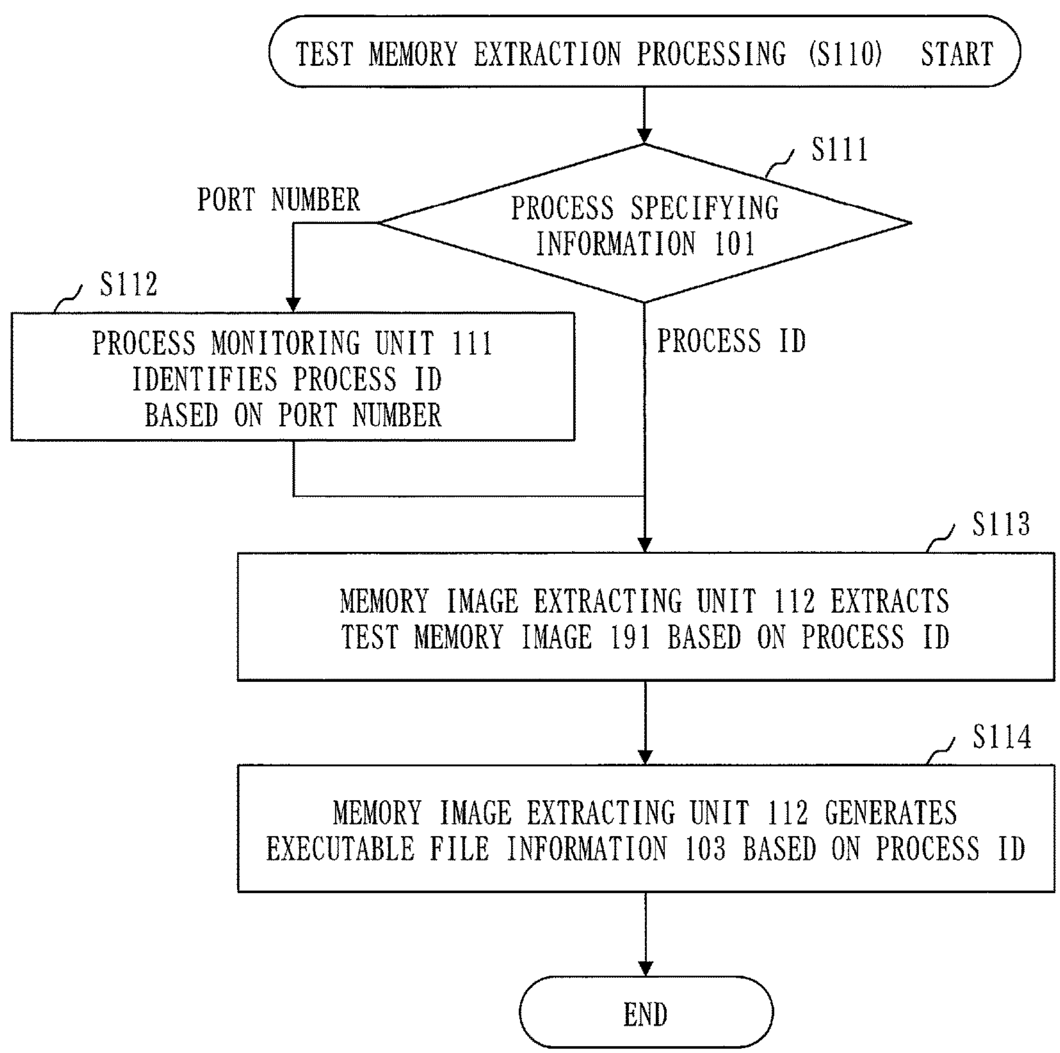
FIG. 4 is a flowchart illustrating test memory extraction processing (S110) according to the first embodiment.

FIG. 4 is a flowchart illustrating the test memory extraction processing (S110) according to the first embodiment.

With reference to FIG. 4, the test memory extraction processing (S110) according to the first embodiment will be described.

In S111, the process monitoring unit 111 determines whether the process specifying information 101 indicates a port number or a process ID.

The process specifying information 101 is information that is specified for identifying the target process to be tested.

If the process specifying information 101 indicates a port number, the processing proceeds to S112.

If the process specifying information 101 indicates a process ID, the processing proceeds to S113.

In S112, based on the port number indicated in the process specifying information 101, the process monitoring unit 111 obtains a process ID of a process communicating using a port identified with this port number.

For example, the process monitoring unit 111 obtains the process ID by executing netstat, Process Monitor, TCPView, or the like. Note that netstat is a function of Windows, and that Process Monitor and TCP View are tools provided by Windows. “Windows” is a registered trademark (the same applies hereinafter).

For example, the executed process list 102 includes a process ID and a port number in association with each other for each executed process, and the process monitoring unit 111 obtains a process ID associated with the pertinent port number from the executed process list 102.

After S112, the processing proceeds to S113.

In S113, based on the process ID indicated in the process specifying information 101 or the process ID obtained in S112, the memory image extracting unit 112 extracts the test memory image 191 from the memory of the target system.

The test memory image 191 is data representing the content of the memory area reserved for the target process out of the memory area of the target system.

The test memory image 191 includes intended use information and protection information of the pertinent memory area. The test memory image 191 also includes a PE header of the target process.

The intended use information of the memory area indicates address ranges of a program area, a data area, a stack area, a heap area, and so on constituting the memory area. The program area and the data area are memory areas that the OS (Operating System) allocates to a process when loading a program (executable file). The program area, the data area, and the stack area are examples of a static memory area reserved at start of execution of an executable file. The heap area is an example of a dynamic memory area reserved during execution of an executable file.

The protection information of the memory area indicates a protection attribute of the memory area per address unit (for example, for each 4 bytes). “Read allowed” indicating that read is allowed, “write allowed” indicating that write is allowed, and “execution allowed” indicating that execution is allowed are examples of protection attributes.

The PE header is rewritten by the OS after the program (executable file) has been loaded.

For example, the memory image extracting unit 112 extracts the test memory image 191 by executing ReadProcessMemory, Volatility, LoadPE, or the like. ReadProcessMemory is an API (Application Program Interface) provided by Windows. Volatility or LoadPE is a memory dump tool which is available free of charge.

For example, the executed process list 102 includes a process ID and a memory image in association with each other for each executed process, and the memory image extracting unit 112 obtains a memory image (test memory image 191) associated with the pertinent process ID from the executed process list 102.

After S113, the processing proceeds to S114.

In S114, based on the process ID indicated in the process specifying information 101 or the process ID obtained in S112, the memory image extracting unit 112 generates the executable file information 103.

The executable file information 103 is information indicating the target executable file from which the target process originates.

The executable file information 103 includes a name, a path, a version, a message digest, and so on of the target executable file (see FIG. 5). Note that the memory image extracting unit 112 calculates the message digest by computing a hash function such as MD5, SHA1, or SHA256.

If shared libraries (for example, DLL: Dynamic Link Library) are activated when the target executable file is executed, the executable file information 103 includes information on the shared libraries (.dll) in addition to information on the target executable file (.exe) (see FIG. 6). These shared libraries will also hereinafter be referred to as the target executable file.

FIG. 5 and FIG. 6 are diagrams illustrating examples of the executable file information 103 according to the first embodiment.

After S114, the test memory extraction processing (S110) terminates.

Referring back to FIG. 2, the description will be continued from S120.

In S120, the template memory extracting unit 120 extracts the template memory image 192 corresponding to the test memory image 191 from a memory of the template system.

After S120, the processing proceeds to S130.

Template memory extraction processing (S120) by the template memory extracting unit 120 will be described in detail below.

Figure 7:
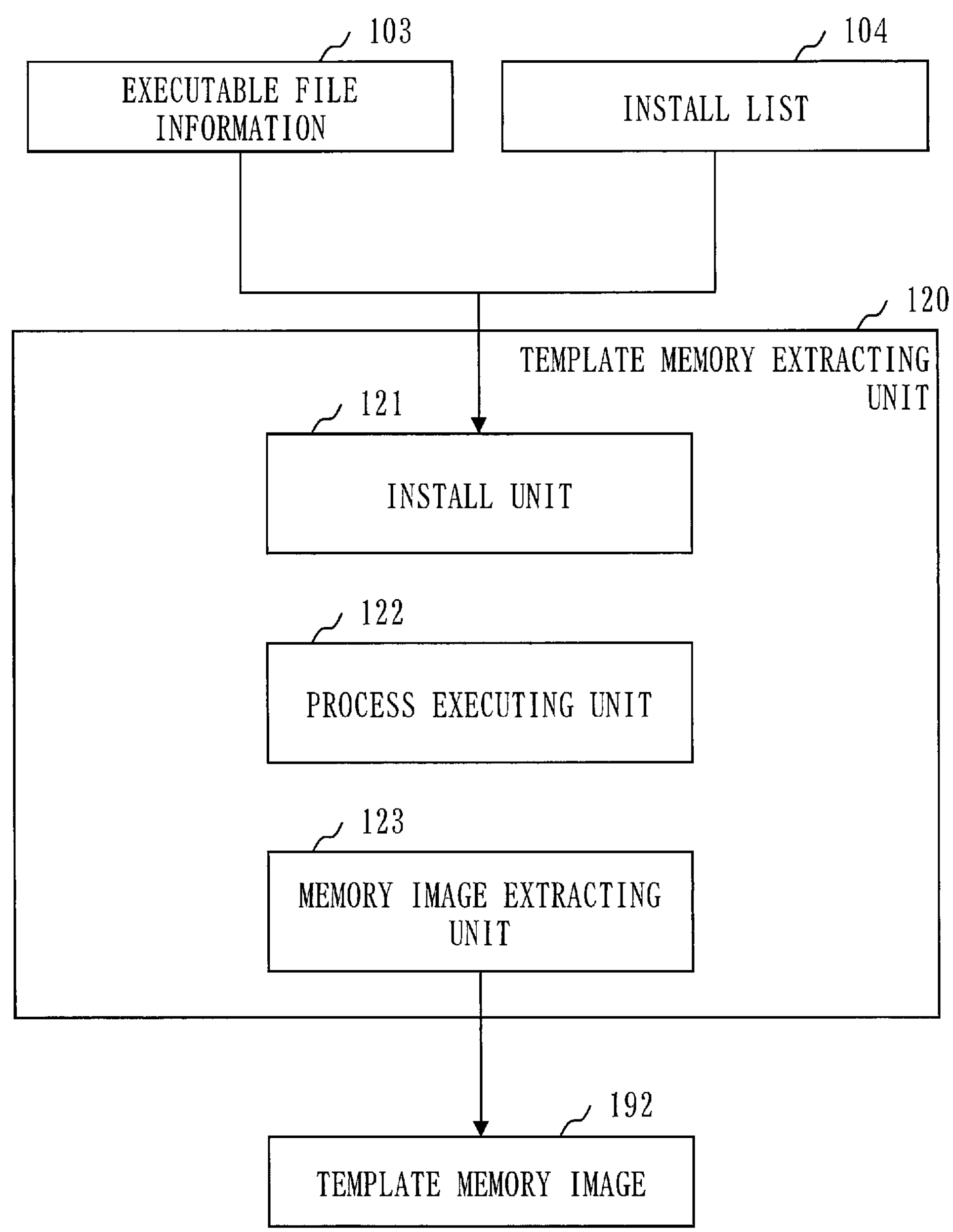
FIG. 7 is a functional configuration diagram of a template memory extracting unit 120 according to the first embodiment.

FIG. 7 is a functional configuration diagram of the template memory extracting unit 120 according to the first embodiment.

As illustrated in FIG. 7, the template memory extracting unit 120 includes an install unit 121, a process executing unit 122, and a memory image extracting unit 123.

The install unit 121 determines whether or not the target executable file has been installed on the template system based on the executable file information 103 and the install list 104. If the target executable file has not been installed on the template system, the install unit 121 installs the target executable file on the template system and updates the install list 104.

The process executing unit 122 causes the template system to execute the target executable file. At this time, the template system generates a process for executing the target executable file. The process generated by the template system will hereinafter be referred to as a “template process”.

The memory image extracting unit 123 extracts the template memory image 192 representing the content of the memory area reserved for the template process from the memory of the template system.

Figure 8:
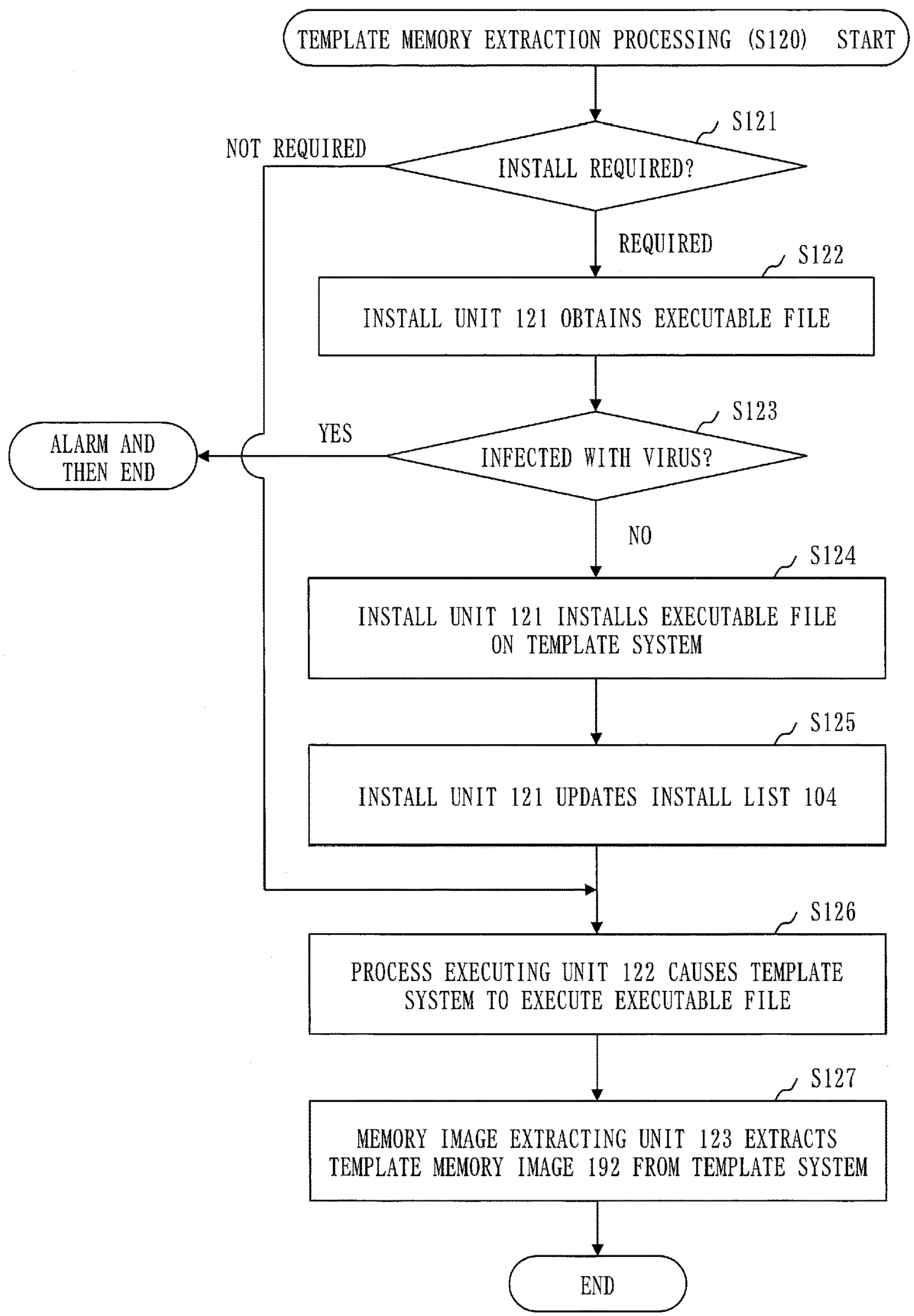
FIG. 8 is a flowchart illustrating template memory extraction processing (S120) according to the first embodiment.

FIG. 8 is a flowchart illustrating the template memory extraction processing (S120) according to the first embodiment.

With reference to FIG. 8, the template memory extraction processing (S120) according to the first embodiment will be described.

In S121, based on the executable file information 103 and the install list 104, the install unit 121 determines whether or not the target executable file has been installed on the template system. That is, the install unit 121 determines whether or not it is necessary to install the target executable file on the template system.

If information that is identical to the executable file information 103 is included in the install list 104, the install unit 121 determines that the target executable file has been installed on the template system. For example, the install list 104 illustrated in FIG. 9 includes information (name, path, version, message digest) that is identical to the executable file information 103 illustrated in FIG. 5. In this case, the install unit 121 determines that the target executable file (calc.exe) has been installed on the template system.

If information that is identical to the executable file information 103 is not included in the install list 104, the install unit 121 determines that the target executable file has not been installed on the template system. For example, the install list 104 illustrated in FIG. 10 includes information of which some of the information (version, message digest) is different from the executable file information 103 illustrated in FIG. 5, but does not include information that is identical with the executable file information 103. In this case, the install unit 121 determines that the target executable file (calc.exe) has not been installed on the template system.

FIG. 9 and FIG. 10 are diagrams illustrating examples of the install list 104 according to the first embodiment.

If the target executable file has been installed on the template system, that is, if it is not necessary to install the target executable file on the template system, the processing proceeds to S126.

If the target executable file has not been installed on the template system, that is, if it is necessary to install the target executable file on the template system, the processing proceeds to S122.

In S122, the install unit 121 obtains an executable file that is identical to the target executable file based on the executable file information 103. For example, the install unit 121 obtains the executable file that is identical to the target executable file from a file server through the Internet.

After S122, the processing proceeds to S123.

In S123, the install unit 121 performs a virus test on the executable file obtained in S122 and determines whether or not the executable file is infected with a virus.

For example, the install unit 121 performs the virus test by executing anti-virus software available free of charge or commercially.

If it is determined that the executable file is infected with a virus, the install unit 121 outputs an alarm to notify that the executable file to be installed on the template system is infected with a virus. Then, the template memory extraction processing (S120) terminates. The process testing apparatus 100 does not perform processing subsequent to the template memory extraction processing (S120) and terminates the processing of the process testing method.

If it is determined that the executable file is not infected with a virus, the processing proceeds to S124.

In S124, the install unit 121 installs the executable file obtained in S122 on the template system.

However, if an executable file having the same name as that of the executable file obtained in S122 (a file with the same name) has been installed on the template system, the install unit 121 uninstalls the file with the same name and then installs the obtained executable file.

The executable file can be installed on the template system by controlling an OS (guest OS) of a virtual machine functioning as the template system. For example, by causing vmrun.exe of VMware Server to read a script through the OS (host OS) of the process testing apparatus 100, the guest OS can be controlled from the host OS.

After S124, the processing proceeds to S125.

In S125, the install unit 121 updates the install list 104 by adding or overwriting with information on the executable file installed in S124.

For example, the install list 104 of FIG. 9 is obtained by overwriting the information on the executable file "calc.exe" included in the install list 104 of FIG. 10.

After S125, the processing proceeds to S126.

In S126, the process executing unit 122 causes the template system to execute the target executable file. That is, the process executing unit 122 causes the template system to execute the process for executing the target executable file (the template process).

After S126, the processing proceeds to S127.

In S127, the memory image extracting unit 123 identifies a process ID of the template process executed in S126.

Then, based on the identified process ID, the memory image extracting unit 123 extracts the template memory image 192 representing the content of the memory area reserved for the template process from the memory of the template system.

The method for extracting the template memory image 192 is substantially the same as the method for extracting the test memory image 191 (S113 of FIG. 4).

The template memory image 192 includes intended use information and protection information of the pertinent memory area, similarly to the test memory image 191. The template memory image 192 also includes a PE header of the template process.

After S127, the template memory extraction processing (S120) terminates.

Referring back to FIG. 2, the description will be continued from S130.

In S130, the injected code detecting unit 130 compares the test memory image 191 with the template memory image 192 and generates the injected code list 193.

After S130, the processing proceeds to S140.

Injected code detection processing (S130) by the injected code detecting unit 130 will be described in detail below.

Figure 11:
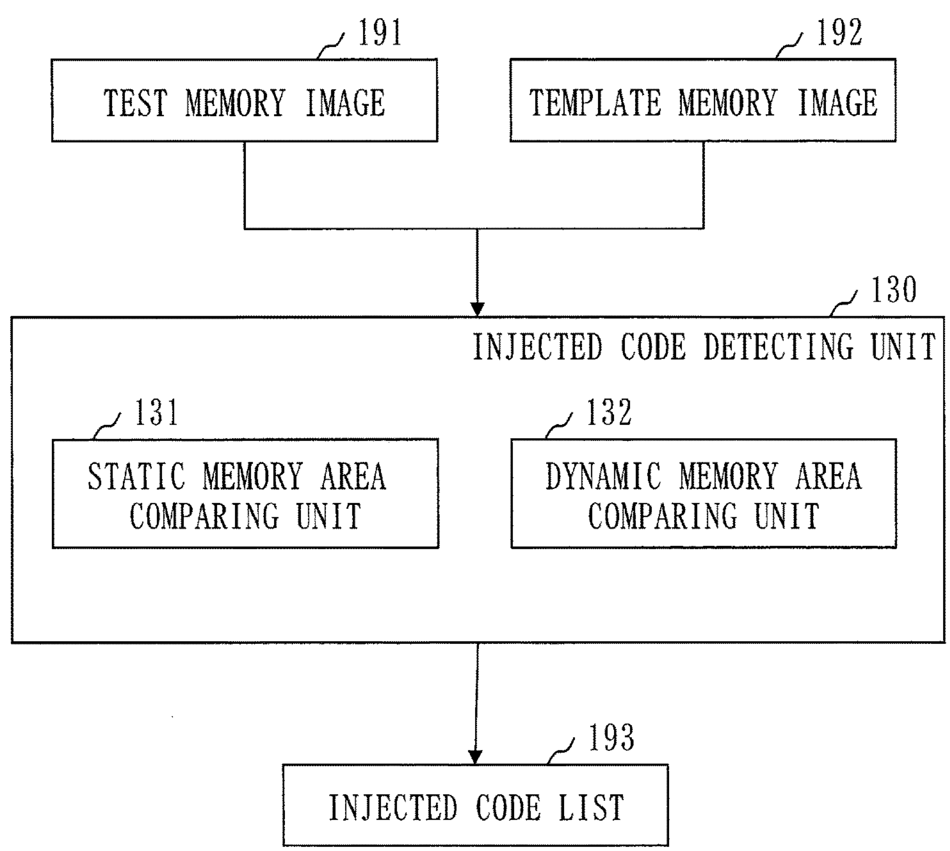
FIG. 11 is a functional configuration diagram of an injected code detecting unit 130 according to the first embodiment.

FIG. 11 is a functional configuration diagram of the injected code detecting unit 130 according to the first embodiment.

As illustrated in FIG. 11, the injected code detecting unit 130 includes a static memory area comparing unit 131 and a dynamic memory area comparing unit 132.

The static memory area comparing unit 131 compares a static memory area represented by the test memory image 191 with a static memory area represented by the template memory image 192, and generates the injected code list 193 of the static memory area. The static memory area is a memory area reserved at start of execution of an executable file.

The dynamic memory area comparing unit 132 compares a dynamic memory area represented by the test memory image 191 with a dynamic memory area represented by the template memory image 192, and generates the injected code list 193 of the dynamic memory area. The dynamic memory area is a memory area reserved during execution of an executable file.

The injected code list 193 is a list indicating information on a continuous memory area where an injected code is stored (to be hereinafter referred to as an injected code block) out of the memory area represented by the test memory image 191.

Figure 12:
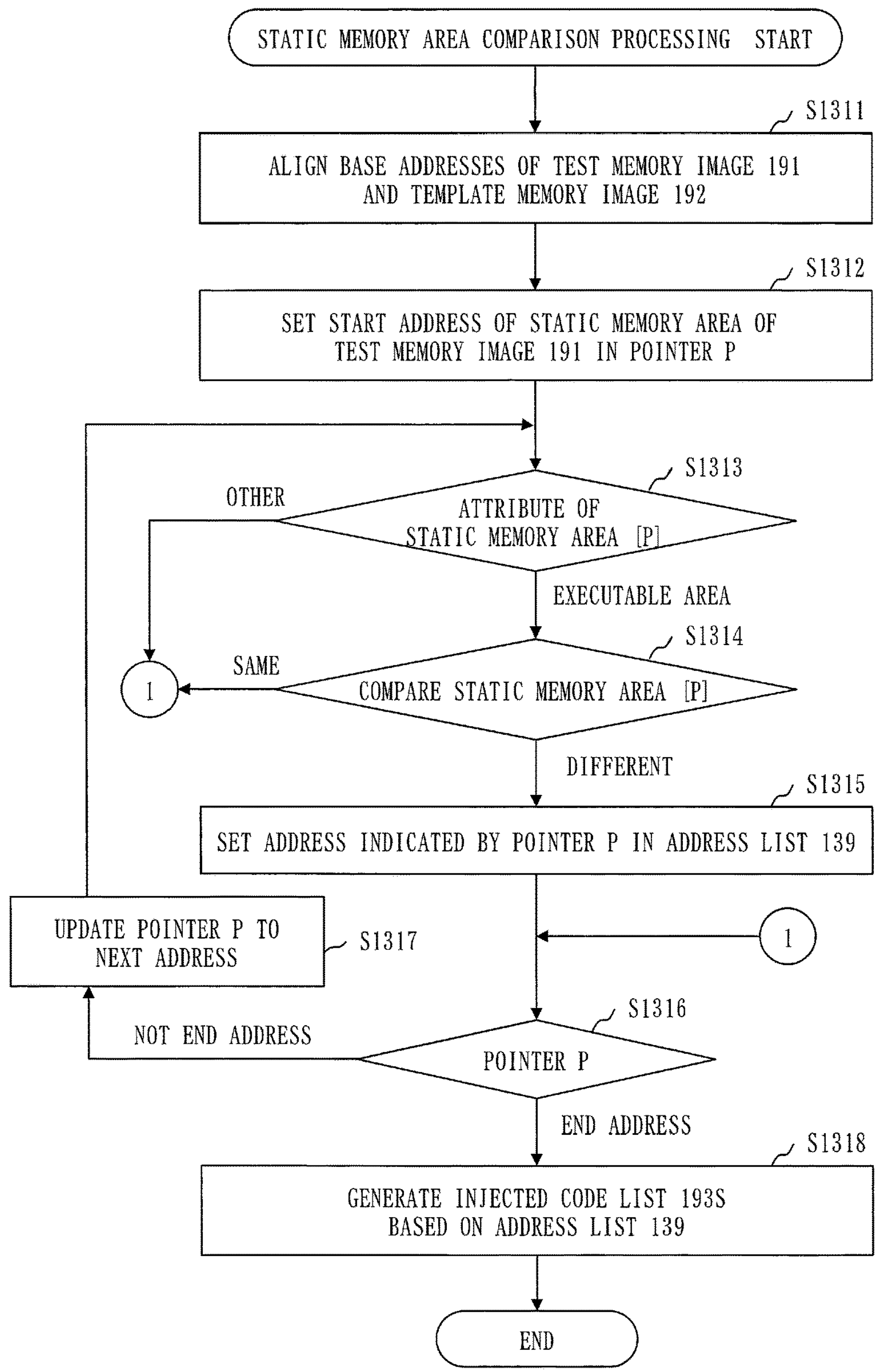
FIG. 12 is a flowchart illustrating injected code detection processing (S130) by a static memory area comparing unit 131 according to the first embodiment.

FIG. 12 is a flowchart illustrating the injected code detection processing (S130) by the static memory area comparing unit 131 according to the first embodiment.

With reference to FIG. 12, the injected code detection processing (S130) by the static memory area comparing unit 131 will be described.

In S1311, the static memory area comparing unit 131 aligns base addresses (start addresses) of the test memory image 191 and the template memory image 192.

After S1311, the processing proceeds to S1312.

In S1312, based on the intended use information included in the test memory image 191, the static memory area comparing unit 131 identifies a static memory area out of the memory area represented by the test memory image 191.

Then, the static memory area comparing unit 131 sets a start address of the identified static memory area in a pointer P.

The static memory area per address unit (for example, 1 byte or 4 bytes) indicated by the pointer P will hereinafter be described as a "static memory area [P]".

After S1312, the processing proceeds to S1313.

In S1313, based on the protection information included in the test memory image 191, the static memory area comparing unit 131 determines whether or not the static memory area [P] out of the test memory image 191 is a memory area that is executable (executable area).

If the static memory area [P] out of the test memory image 191 is an executable area, the processing proceeds to S1314.

If the static memory area [P] out of the test memory image 191 is not an executable area, the processing proceeds to S1316.

In S1314, the static memory area comparing unit 131 compares the content of the static memory area [P] of the test memory image 191 with the content of the static memory area [P] of the template memory image 192. That is, the static memory area comparing unit 131 compares a binary code of the static memory area [P] out of the test memory image 191 with a binary code of the static memory area [P] out of the template memory image 192.

If the content of the static memory area [P] of the test memory image 191 is the same as the content of the static memory area [P] of the template memory image 192, the processing proceeds to S1316.

If the content of the static memory area [P] of the test memory image 191 is different from the content of the static memory area [P] of the template memory image 192, the processing proceeds to S1315.

In S1315, the static memory area comparing unit 131 sets, in an address list 139 (see FIG. 13), the address indicated by the pointer P, that is, the address of the static memory area where the content is different from the template memory image 192 out of the static memory area represented by the test memory image 191.

FIG. 13 is a diagram illustrating an example of the address list 139 according to the first embodiment. The address list 139 of FIG. 13 includes an "address" and a "code" in association with each other. The "address" indicates an address indicated by the pointer P, and the "code" indicates the content (program code) of the static memory area per address unit.

After S1315, the processing proceeds to S1316.

In S1316, based on the intended use information included in the test memory image 191, the static memory area comparing unit 131 determines whether or not the address indicated by the pointer P is the end address of the static memory area out of the test memory image 191.

If the address indicated by the pointer P is the end address of the static memory area out of the test memory image 191, the processing proceeds to S1318.

If the address indicated by the pointer P is not the end address of the static memory area out of the test memory image 191, the processing proceeds to S1317.

In S1317, the static memory area comparing unit 131 updates the address that is set in the pointer P to the next address.

For example, the static memory area comparing unit 131 increments the current address "4920B8" that is set in the pointer P, and thereby updates the address indicated by the pointer P to the next address "4920B9".

After S1317, the processing returns to S1313.

In S1318, the static memory area comparing unit 131 generates an injected code list 193S based on the address list 139. Note that the injected code list 193 of the static memory area will be described as the "injected code list 193S".

The injected code list 193S is a list of the static memory area identified by the address list 139 out of the static memory area represented by the test memory image 191. That is, the injected code list 193S is a list for identifying a program code included in the static memory area represented by the test memory image 191, but not included in the static memory area represented by the template memory image 192 (an injected code).

For example, the static memory area comparing unit 131 generates the injected code list 193S of FIG. 14 based on the address list 139 of FIG. 13.

The injected code list 193S of FIG. 14 indicates a "block number", a "start address", and a "size" of the injected code block.

FIG. 14 is a diagram illustrating an example of the injected code list 193S according to the first embodiment.

After S1318, the injected code detection processing (S130) by the static memory area comparing unit 131 terminates.

Figure 15:
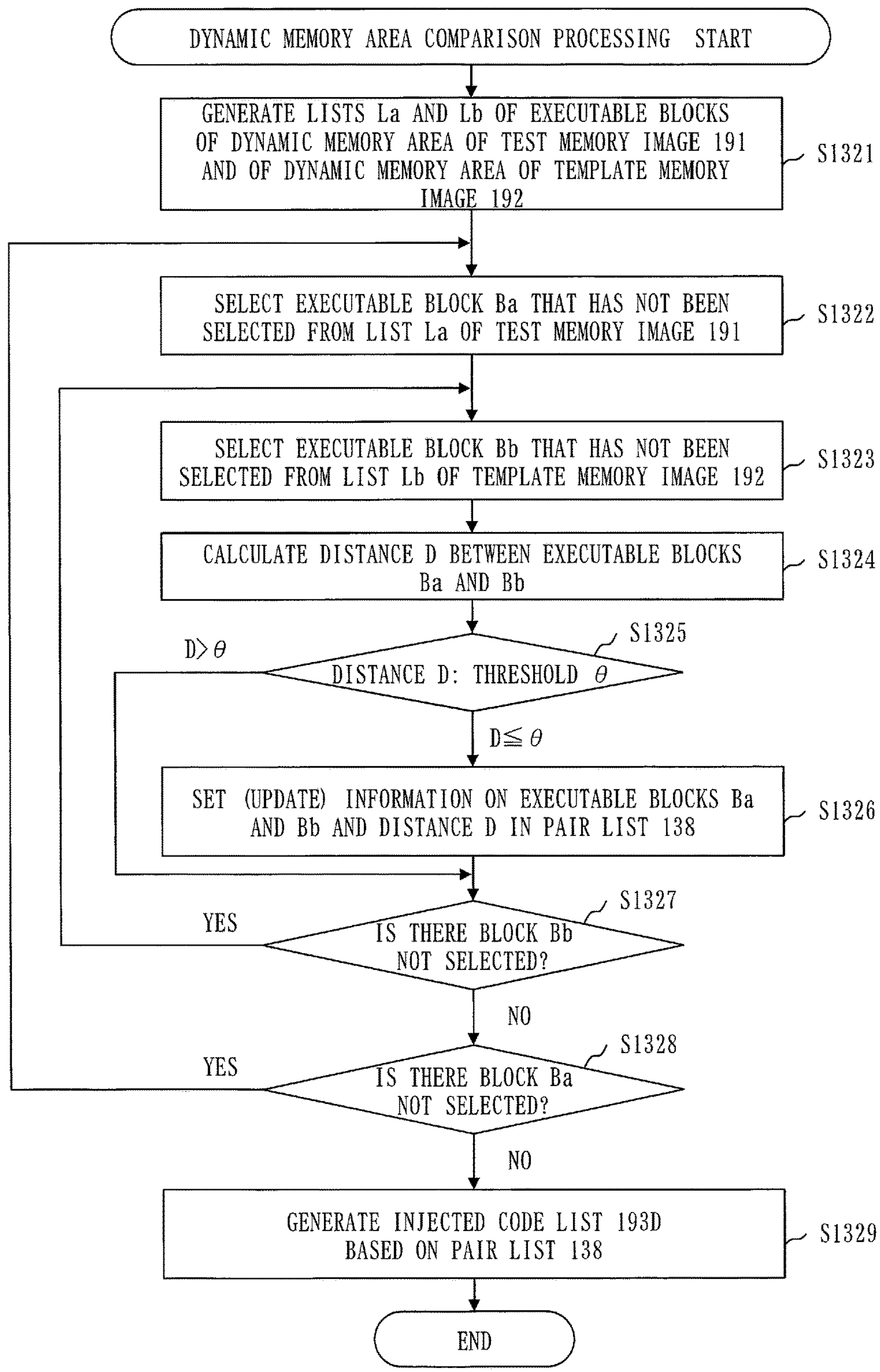
FIG. 15 is a flowchart illustrating injected code detection processing (S130) by a dynamic memory area comparing unit 132 according to the first embodiment.

FIG. 15 is a flowchart illustrating the injected code detection processing (S130) by the dynamic memory area comparing unit 132 according to the first embodiment.

With reference to FIG. 15, the injected code detection processing (S130) by the dynamic memory area comparing unit 132 will be described.

In S1321, based on the intended use information included in the test memory image 191, the dynamic memory area comparing unit 132 identifies a dynamic memory area out of the memory area represented by the test memory image 191.

Based on the protection information included in the test memory image 191, the dynamic memory area comparing unit 132 identifies a memory area that is executable (executable area) out of the memory area represented by the test memory image 191.

Then, the dynamic memory area comparing unit 132 generates a list La of information indicating a continuous executable area out of the dynamic memory area represented by the test memory image 191.

The continuous executable area out of the dynamic memory area will hereinafter be referred to as an "executable block".

The dynamic memory area comparing unit 132 generates a list Lb of executable blocks of the template memory image 192, similarly to the list La of executable blocks of the test memory image 191.

After S1321, the processing proceeds to S1322.

In S1322, the dynamic memory area comparing unit 132 selects an executable block Ba that has not been selected from the list La of the test memory image 191. Note that an executable block indicated in the list La will be described as an "executable block Ba".

For example, the dynamic memory area comparing unit 132 selects an executable block Ba sequentially from the beginning of the list La.

After S1322, the processing proceeds to S1323.

S1323 through S1327 are executed for each executable block Ba selected in S1322.

In S1323, the dynamic memory area comparing unit 132 selects an executable block Bb that has not been selected from the list Lb of the template memory image 192.

Note that an executable block indicated in the List Lb will be described as an "executable block Bb".

For example, the dynamic memory area comparing unit 132 selects an executable block Bb sequentially from the beginning of the list Lb.

After S1323, the processing proceeds to S1324.

In S1324, the dynamic memory area comparing unit 132 extracts operation codes from the program codes included in the executable block Ba selected in S1322 and generates a list of the extracted operation codes.

The dynamic memory area comparing unit 132 extracts operation codes from the program codes included in the executable block Bb selected in S1323 and generates a list of the extracted operation codes.

Then, the dynamic memory area comparing unit 132 calculates a distance D between the list of the operation codes extracted from the executable block Ba and the list of the operation codes extracted from the executable block Bb.

The distance D represents a similarity degree between the list of the operation codes extracted from the executable block Ba and the list of the operation codes extracted from the executable block Bb. The smaller the distance D is, the higher the similarity degree becomes.

As an example of the distance D, a Hamming distance and a Levenshtein distance (also referred to as edit distance) may be pointed out.

After S1324, the processing proceeds to S1325.

In S1325, the dynamic memory area comparing unit 132 compares the distance D calculated in S1324 with a predetermined threshold θ for the similarity degree.

If the distance D is equal to or smaller than the threshold θ, the processing proceeds to S1326.

If the distance D is larger than the threshold θ, the processing proceeds to S1327.

In S1326, the dynamic memory area comparing unit 132 sets, in a pair list 138, information on the executable block Ba selected in S1322, information on the executable block Bb selected in S1323, and the distance D calculated in S1324.

However, if information on the executable block Ba selected in S1322 has already been set in the pair list 138, the dynamic memory area comparing unit 132 operates as described below. Note that the information on the executable block Bb and a distance D that have been set in the pair list 138 in association with the executable block Ba selected in S1322 will be described as "information on the executable block Bb'" and a "distance D'", respectively.

The dynamic memory area comparing unit 132 compares the distance D' set in the pair list 138 with the distance D calculated in S1324.

If the distance D is smaller than the distance D', the dynamic memory area comparing unit 132 updates the information on the executable block Bb' set in the pair list 138 to the information on the executable block Bb selected in S1323. The dynamic memory area comparing unit 132 also updates the distance D' set in the pair list 138 to the distance D calculated in S1324.

If the distance D is equal to or larger than the distance D', the dynamic memory area comparing unit 132 does not update the information on the executable block Bb' and the distance D' that are set in the pair list 138. That is, the dynamic memory area comparing unit 132 is not required to set the information on the executable block Bb selected in S1323 and the distance D calculated in S1324 in the pair list 138.

FIG. 16 is an example of the pair list 138 according to the first embodiment.

For example, the dynamic memory area comparing unit 132 generates the pair list 138 as illustrated in FIG. 16.

The pair list 138 of FIG. 16 indicates a block number for identifying an executable block Ba, a block number for identifying an executable block Bb, and a distance D between the executable block Ba and the executable block Bb.

After S1326 (see FIG. 15), the processing proceeds to S1327.

In S1327, the dynamic memory area comparing unit 132 determines whether or not there is an executable block Bb that has not been selected in S1323 in association with the executable block Ba selected in S1322.

If there is an executable block Bb that has not been selected, the processing returns to S1323.

If there is no executable block Bb that has not been selected, the processing proceeds to S1328.

In S1328, the dynamic memory area comparing unit 132 determines whether or not there is an executable block Ba that has not been selected in S1322.

If there is an executable block Ba that has not been selected, the processing returns to S1322.

If there is no executable block Ba that has not been selected, the processing proceeds to S1329.

In S1329, the dynamic memory area comparing unit 132 generates an injected code list 193D based on the list La of the test memory image 191 and the pair list 138. Note that the injected code list 193 of the dynamic memory area will be described as the "injected code list 193D".

The injected code list 193D indicates information on an executable block Ba that is not set in the pair list 138 among information on the executable blocks Ba included in the list La of the test memory image 191. That is, the injected code list 193D is a list for identifying a non-similar executable block Ba which is not similar to any of the executable block Bbs included in the template memory image 192, among the executable blocks Ba included in the test memory image 191.

For example, the dynamic memory area comparing unit 132 generates the injected code list 193D of FIG. 17 based on the pair list 138 of FIG. 16.

The injected code list 193D of FIG. 17 indicates a "block number", a "start address", and a "size" of a non-similar executable block Ba (injected code block).

FIG. 17 is a diagram illustrating an example of the injected code list 193D according to the first embodiment.

After S1329, the injected code detection processing (S130) by the dynamic memory area comparing unit 132 terminates.

Referring back to FIG. 2, the description will be continued from S140.

In S140, based on the injected code list 193, the injected code testing unit 140 extracts an injected code from the memory area represented by the test memory image 191.

The injected code testing unit 140 determines for each extracted injected code whether or not the injected code meets at least any of the test rules included in the test rule list 194, that is, whether or not the injected code is a malicious program code (malicious code) generated by malware.

Then, the injected code testing unit 140 generates the malicious code list 195 for identifying a malicious code.

Note that an injected code may be interpreted as an injected code block and a malicious code may be interpreted as a malicious code block. An injected code block signifies the content of a continuous memory area where an injected code is stored, and a malicious code block signifies the content of a continuous memory area where a malicious code is stored.

FIG. 18 is a diagram illustrating an example of the test rule list 194 according to the first embodiment.

With reference to FIG. 18, an example of the test rule list 194 according to the first embodiment will be described.

The test rule list 194 indicates a "rule number" for identifying a test rule and the content of the "test rule".

The test rule of a rule number "1" signifies that an injected code that meets all of a rule (1), a rule (2), and a rule (3) is a malicious code.

For example, the rule (1) to the rule (3) are the following rules.

The rule (1) signifies a feature that a program code for deleting an executable file is included.

The rule (2) signifies a feature that a program code for exhaustively searching stored files is included.

The rule (3) signifies a feature that a program code for uploading a file to the Internet is included.

The program code that is signified by each of the rule (1) to the rule (3) is a program code for performing normal operation. However, it is highly likely that an injected code including all of these program codes is a malicious code.

FIG. 19 is a diagram illustrating an example of the malicious code list 195 according to the first embodiment.

With reference to FIG. 19, an example of the malicious code list 195 according to the first embodiment will be described.

The malicious code list 195 indicates a "code number", a "start address", and a "size" of a malicious code block, and indicates a "rule number" of a test rule which is pertinent to the malicious code block.

After S140 (see FIG. 2), the processing proceeds to S150.

In S150, the test result output unit 150 generates the test result file 196 based on the malicious code list 195, and outputs the generated test result file 196. For example, the test result output unit 150 displays the content of the test result file 196 on a display device.

The test result file 196 includes the process ID of the target process specified by the process specifying information 101, information indicating whether or not a malicious code is included in the target process, information on the malicious code included in the target process, and so on.

After S150, the processing of the process testing method terminates.

Figure 20:
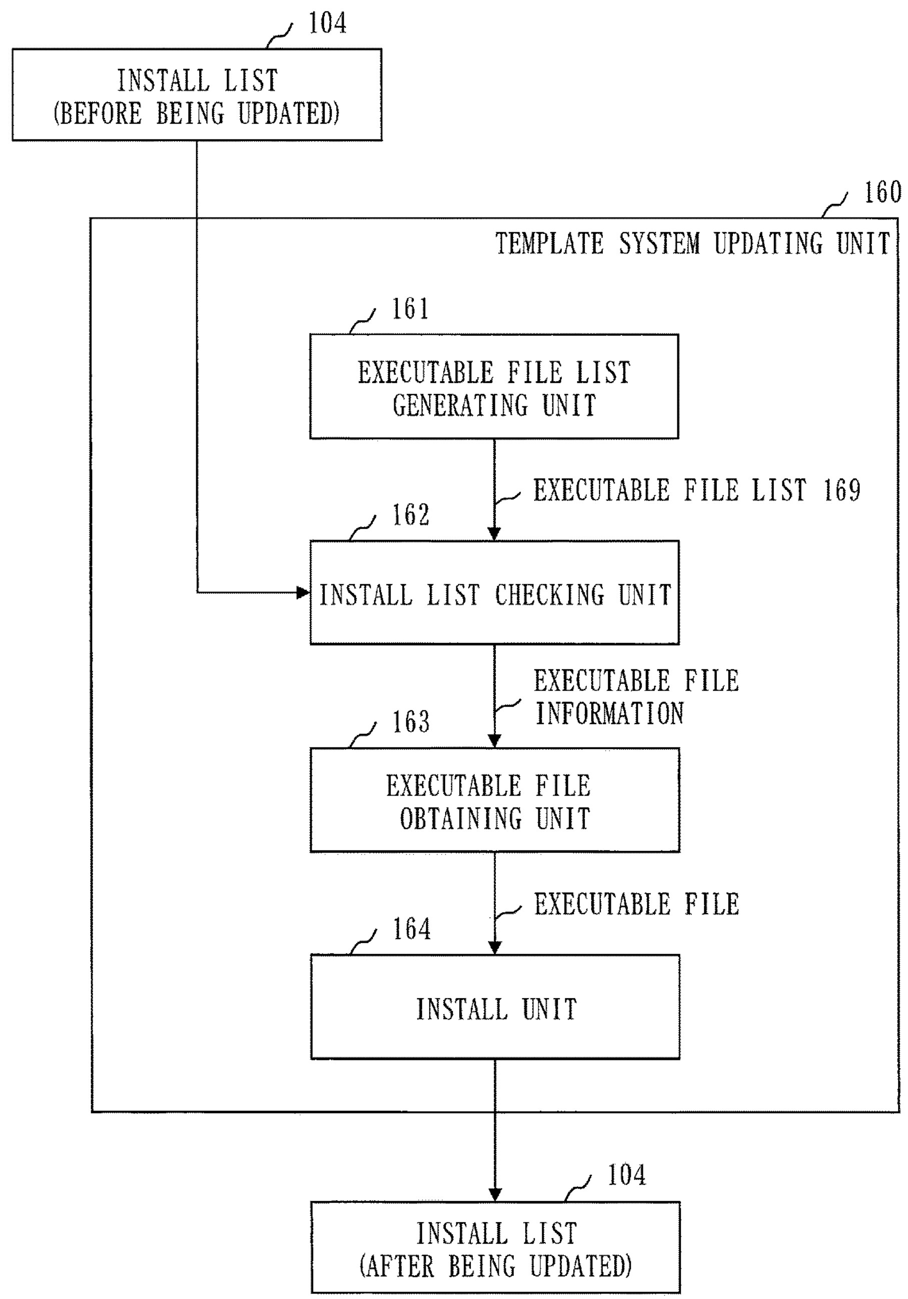
FIG. 20 is a functional configuration diagram of a template system updating unit 160 according to the first embodiment.

FIG. 20 is a functional configuration diagram of the template system updating unit 160 according to the first embodiment.

With reference to FIG. 20, the functional configuration of the template system updating unit 160 according to the first embodiment will be described.

The template system updating unit 160 includes an executable file list generating unit 161, an install list checking unit 162, an executable file obtaining unit 163, and an install unit 164.

The executable file list generating unit 161 generates a list of executable files installed on the target system. The list of executable files installed on the target system will hereinafter be referred to as an "executable file list 169".

The install list checking unit 162 identifies an executable file installed on the target system, but not installed on the template system, based on the executable file list 169 and the install list 104.

The executable file obtaining unit 163 obtains the executable file identified by the install list checking unit 162.

The install unit 164 installs the executable file obtained by the executable file obtaining unit 163 on the template system, and updates the install list 104.

Figure 21:
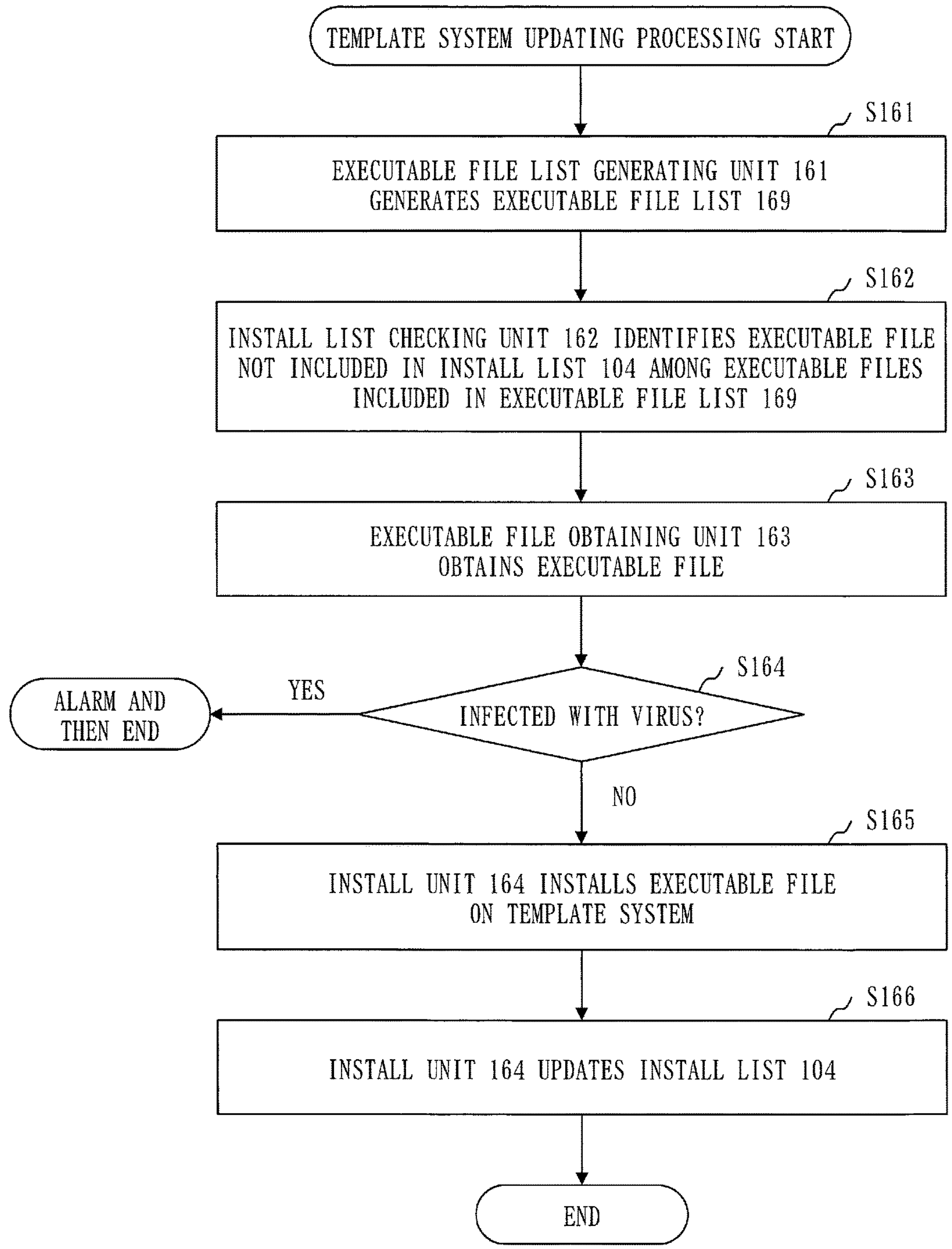
FIG. 21 is a flowchart illustrating template system updating processing by the template system updating unit 160 according to the first embodiment.

FIG. 21 is a flowchart illustrating template system updating processing by the template system updating unit 160 according to the first embodiment.

The template system updating unit 160 executes the template system updating processing illustrated in FIG. 21 on a regular basis.

In S161, the executable file list generating unit 161 generates the executable file list 169 indicating information on executable files installed on the target system.

The executable file list 169 includes a name, a path, a version, a message digest, and so on of each executable file installed on the target system (see FIG. 22). Note that the executable file list generating unit 161 calculates the message digest by computing a hash function such as MD5, SHA1, or SHA256.

FIG. 22 is a diagram illustrating an example of the executable file list 169 according to the first embodiment.

After S161, the processing proceeds to S162.

In S162, the install list checking unit 162 identifies an executable file not included in the install list 104 among the executable files included in the executable file list 169.

For example, when the executable file list 169 of FIG. 22 and the install list 104 of FIG. 10 are compared, executable files "calc.exe", "netepad.exe", "explorer.exe", "user32.dll", and "kerne132.dll" are included in both of the executable file list 169 and the install list 104.

However, "calc.exe" included in the executable file list 169 and "calc.exe" included in the install list 104 have different versions and message digests.

Thus, the install list checking unit 162 identifies the executable file "calc.exe" included in the executable file list 169 as an executable file not included in the install list 104.

After S162, the processing proceeds to S163.

In S163, the executable file obtaining unit 163 obtains the executable file identified in S162. For example, the executable file obtaining unit 163 obtains the executable file from a file server through the Internet.

After S163, the processing proceeds to S164.

In S164, the install unit 164 performs a virus test on the executable file obtained in S163 and determines whether or not the executable file is infected with a virus.

For example, the install unit 164 performs the virus test by executing anti-virus software available free of charge or commercially.

If it is determined that the executable file is infected with a virus, the install unit 164 outputs an alarm to notify that the executable file to be installed on the template system is infected with a virus. Then, the template system updating processing terminates.

If it is determined that the executable file is not infected with a virus, the processing proceeds to S165.

In S165, the install unit 164 installs the executable file obtained in S163 on the template system.

However, if an executable file having the same name as the executable file obtained in S163 (a file with the same name) has been installed on the template system, the install unit 121 uninstalls the file with the same name and then installs the obtained executable file.

The executable file can be installed on the template system by controlling an OS (guest OS) of a virtual machine functioning as the template system. For example, by causing vmrun.exe of VMware Server to read a script through the OS (host OS) of the process testing apparatus 100, the guest OS can be controlled from the host OS.

After S165, the processing proceeds to S166.

In S166, the install unit 164 updates the install list 104 by adding or overwriting with information on the executable file installed in S165.

For example, the install list 104 of FIG. 9 is obtained by overwriting the information on the executable file "calc.exe" included in the install list 104 of FIG. 10.

After S166, the template system updating processing terminates.

Figure 23:
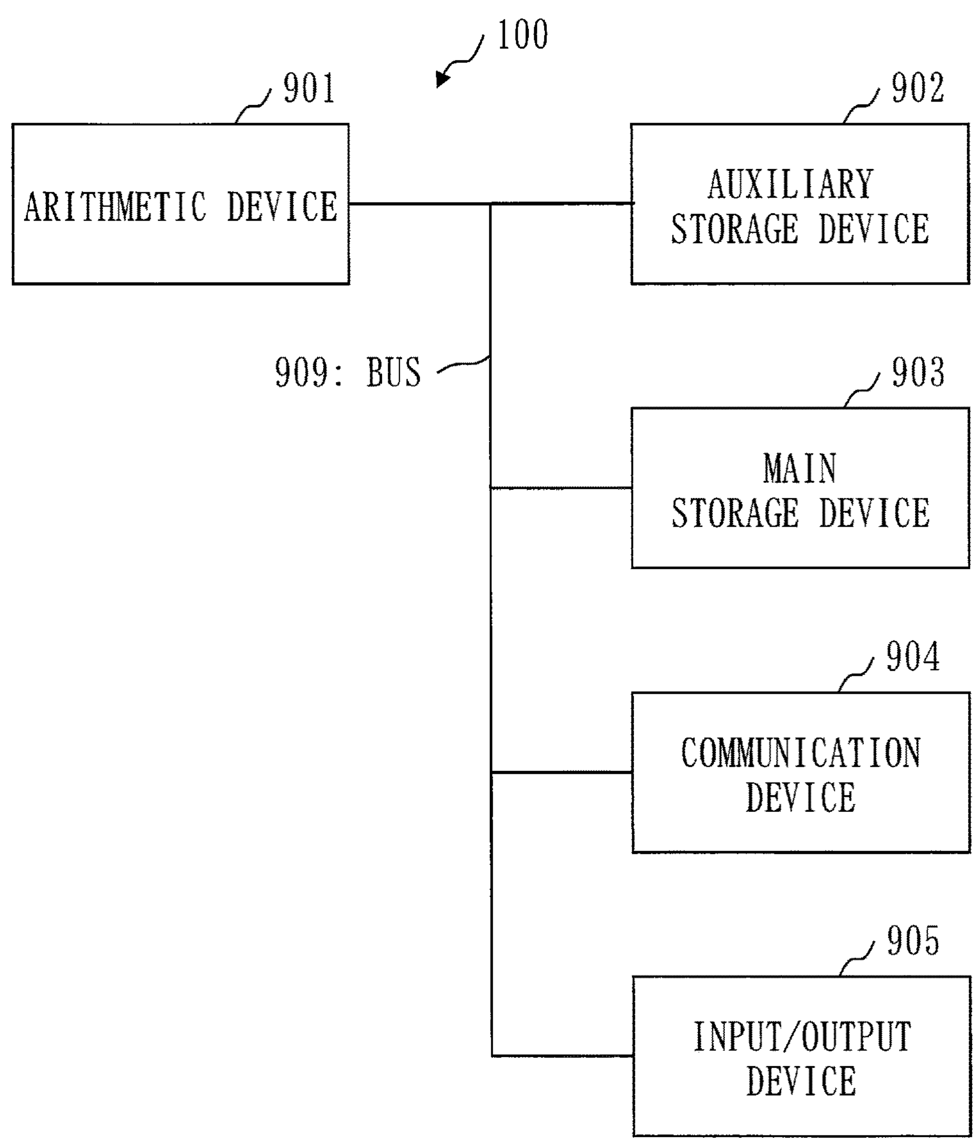
FIG. 23 is a diagram illustrating an example of the hardware configuration of the process testing apparatus 100 according to the first embodiment.

FIG. 23 is a diagram illustrating an example of the hardware configuration of the process testing apparatus 100 according to the first embodiment.

With reference to FIG. 23, an example of the hardware configuration of the process testing apparatus 100 according to the first embodiment will be described.

The process testing apparatus 100 is a computer that includes an arithmetic device 901, an auxiliary storage device 902, a main storage device 903, a communication device 904, and an input/output device 905.

The arithmetic device 901, the auxiliary storage device 902, the main storage device 903, the communication device 904, and the input/output device 905 are connected to a bus 909.

The arithmetic device 901 is a CPU (Central Processing Unit) that executes programs.

The auxiliary storage device 902 is, for example, a ROM (Read Only Memory), a flash memory, or a hard disk device.

The main storage device 903 is, for example, a RAM (Random Access Memory).

The communication device 904 communicates in a wired or wireless manner through the Internet, a LAN (local area network), a telephone network, or other types of network.

The input/output device 905 is, for example, a mouse, a keyboard, and a display device.

The programs are normally stored in the auxiliary storage device 902, and are loaded into the main storage device 903 to be read by the arithmetic device 901 and executed by the arithmetic device 901.

For example, an operating system (OS) is stored in the auxiliary storage device 902. A program for implementing each function described as a "unit" (an example of a process testing program) is also stored in the auxiliary storage device 902. The OS and the program for implementing each function described as a "unit" are loaded into the main storage device 903 and are executed by the arithmetic device 901. A "unit" may be interpreted as "processing" or a "step".

Information, data, signal values, or variable values indicating results of processing such as "recognize", "determine", "extract", "detect", "set", "register", "select", "generate", "input", "output", and so on are stored as files in the main storage device 903 or the auxiliary storage device 902. Other data used by the process testing apparatus 100 is also stored in the main storage device 903 or the auxiliary storage device 902.

FIG. 23 illustrates an example of the hardware configuration of the process testing apparatus 100 according to the first embodiment, and the hardware configuration of the process testing apparatus 100 may be different from the configuration illustrated in FIG. 23.

The method according to the first embodiment (an example of a process testing method) may be implemented by the procedures described using the flowcharts or the like or procedures partially different therefrom.

In the first embodiment, the process testing apparatus 100 such as the following, for example, has been described.

The process testing apparatus 100 identifies an injected code generated in a memory area (including a dynamic memory area) of the target system by comparing the test memory image 191 with the template memory image 192.

The process testing apparatus 100 identifies only a suspicious injected code as a malicious code by analyzing an injected code based on the test rule list 194, so that erroneous detection of a malicious code can be reduced.

The process testing apparatus 100 updates the template system on a regular basis using the template system updating unit 160, and thus correct attribute information about a process for executing an executable file is not required.

Second Embodiment

The first embodiment has described the embodiment in which the process testing apparatus 100 functions as the target system and the template system.

The second embodiment describes an embodiment in which an apparatus that functions as the target system is different from an apparatus that functions as the template system.

Differences from the first embodiment will be mainly described below. What is not described is substantially the same as the first embodiment.

Figure 24:
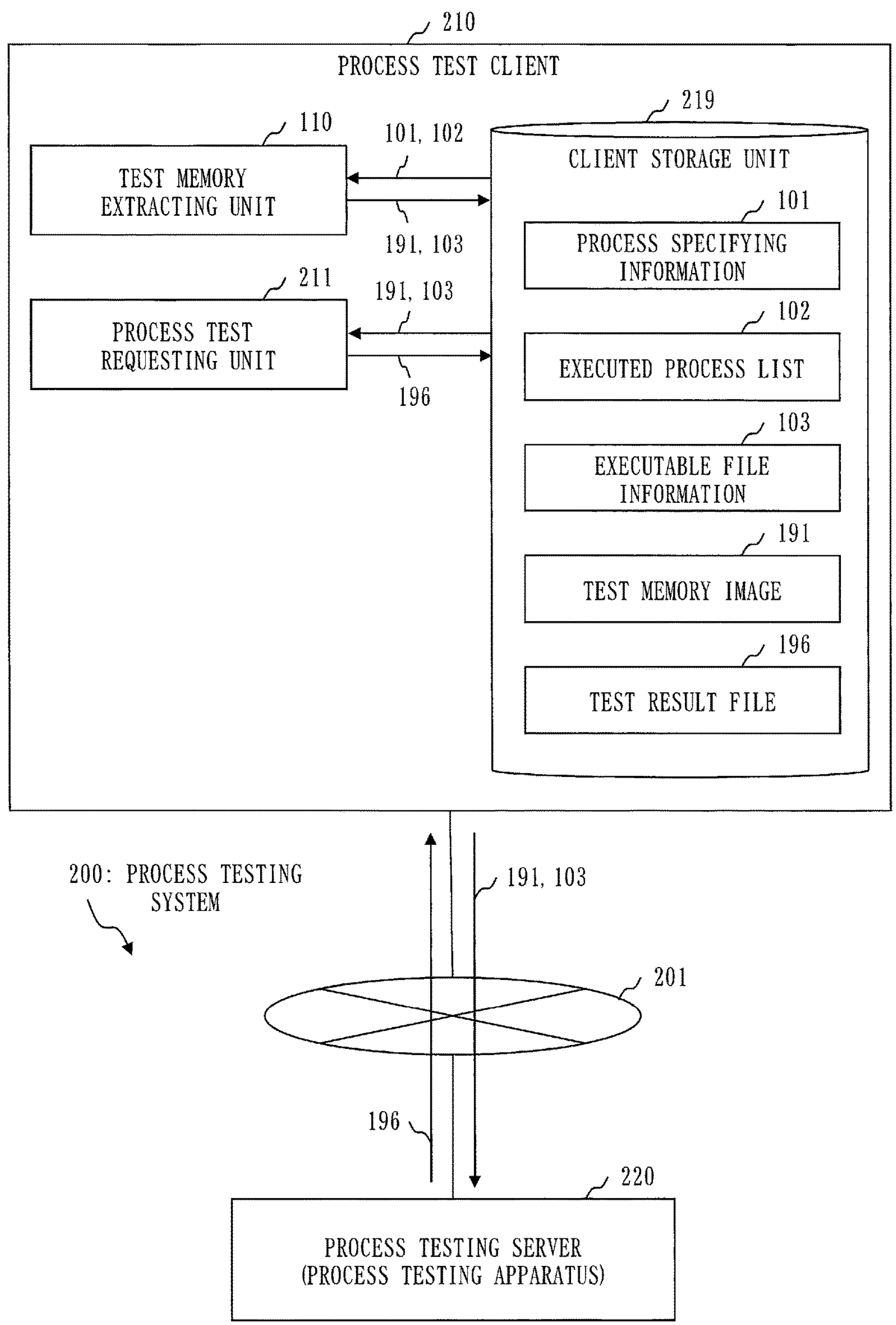
FIG. 24 is a configuration diagram of a process testing system 200 according to a second embodiment.

FIG. 24 is a configuration diagram of a process testing system 200 according to the second embodiment.

With reference to FIG. 24, the configuration of the process testing system 200 according to the second embodiment will be described.

The process testing system 200 includes a process test client 210 and a process testing server 220 (an example of the process testing apparatus).

The process test client 210 and the process testing server 220 communicate with each other through a network 201. The Internet or an in-house LAN (local area network) is an example of the network 201.

The process test client 210 is a computer that functions as the target system.

The process test client 210 includes a test memory extracting unit 110, a process test requesting unit 211, and a client storage unit 219.

The test memory extracting unit 110 is the same as that in the functional configuration of the process testing apparatus 100 described in the first embodiment.

The process test requesting unit 211 transmits the test memory image 191 and the executable file information 103 that are generated by the test memory extracting unit 110 to the process testing server 220, and receives the test result file 196 from the process testing server 220.

The client storage unit 219 is a storage unit of the process test client 210.

Figure 25:
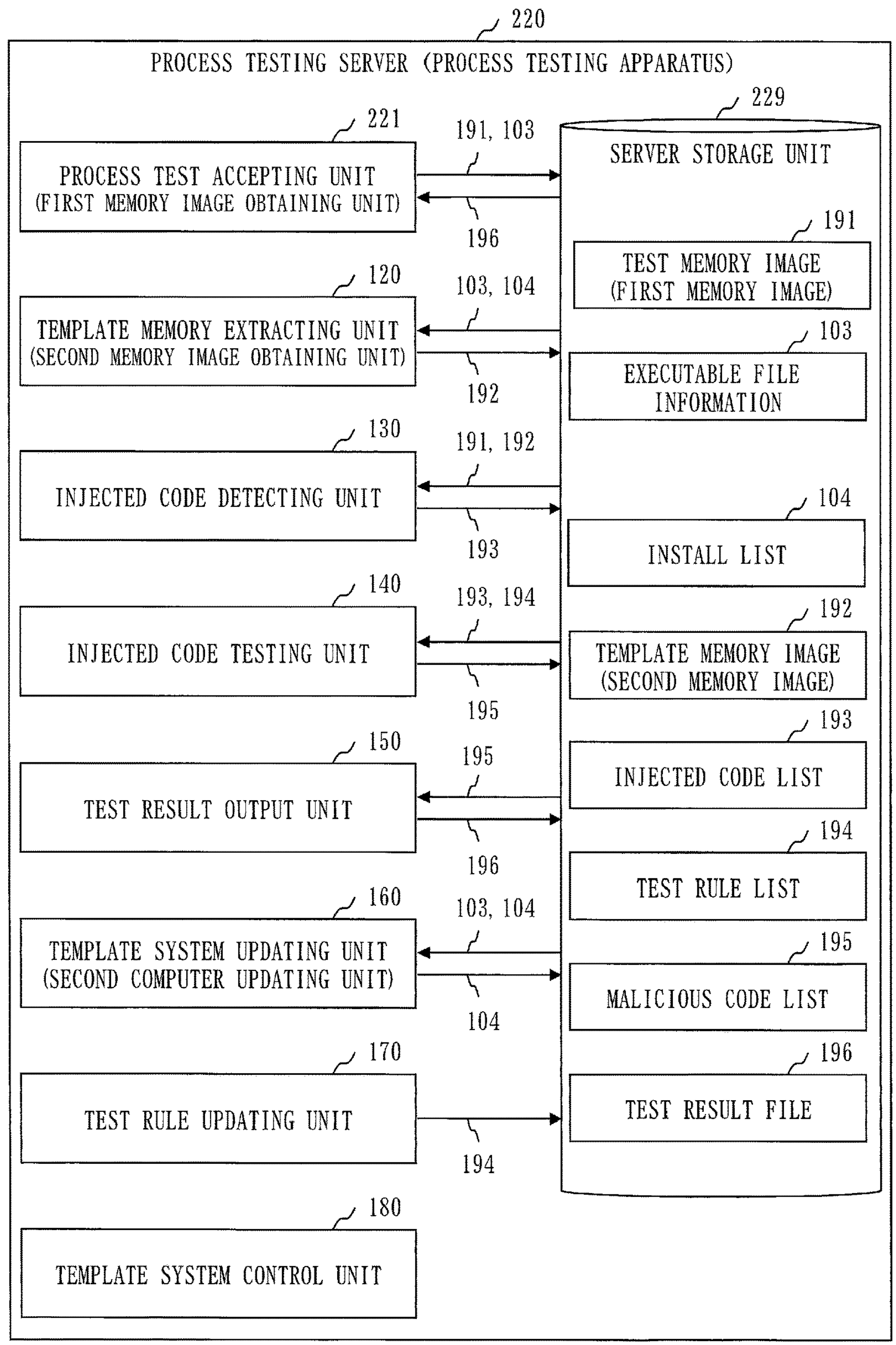
FIG. 25 is a functional configuration diagram of a process testing server 220 according to the second embodiment.

FIG. 25 is a functional configuration diagram of the process testing server 220 according to the second embodiment.

With reference to FIG. 25, the functional configuration of the process testing server 220 according to the second embodiment will be described.

The process testing server 220 (an example of the process testing apparatus) is a computer that functions as the template system.

The process testing server 220 includes a process test accepting unit 221 and a server storage unit 229 in addition to the functional configuration of the process testing apparatus 100 described in the first embodiment (excluding the test memory extracting unit 110 and the apparatus storage unit 190).

The process test accepting unit 221 (an example of the first memory image obtaining unit) receives the test memory image 191 and the executable file information 103 from the process test client 210, and transmits the test result file 196 to the process test client 210.

The server storage unit 229 is a storage unit of the process testing server 220.

Figure 26:
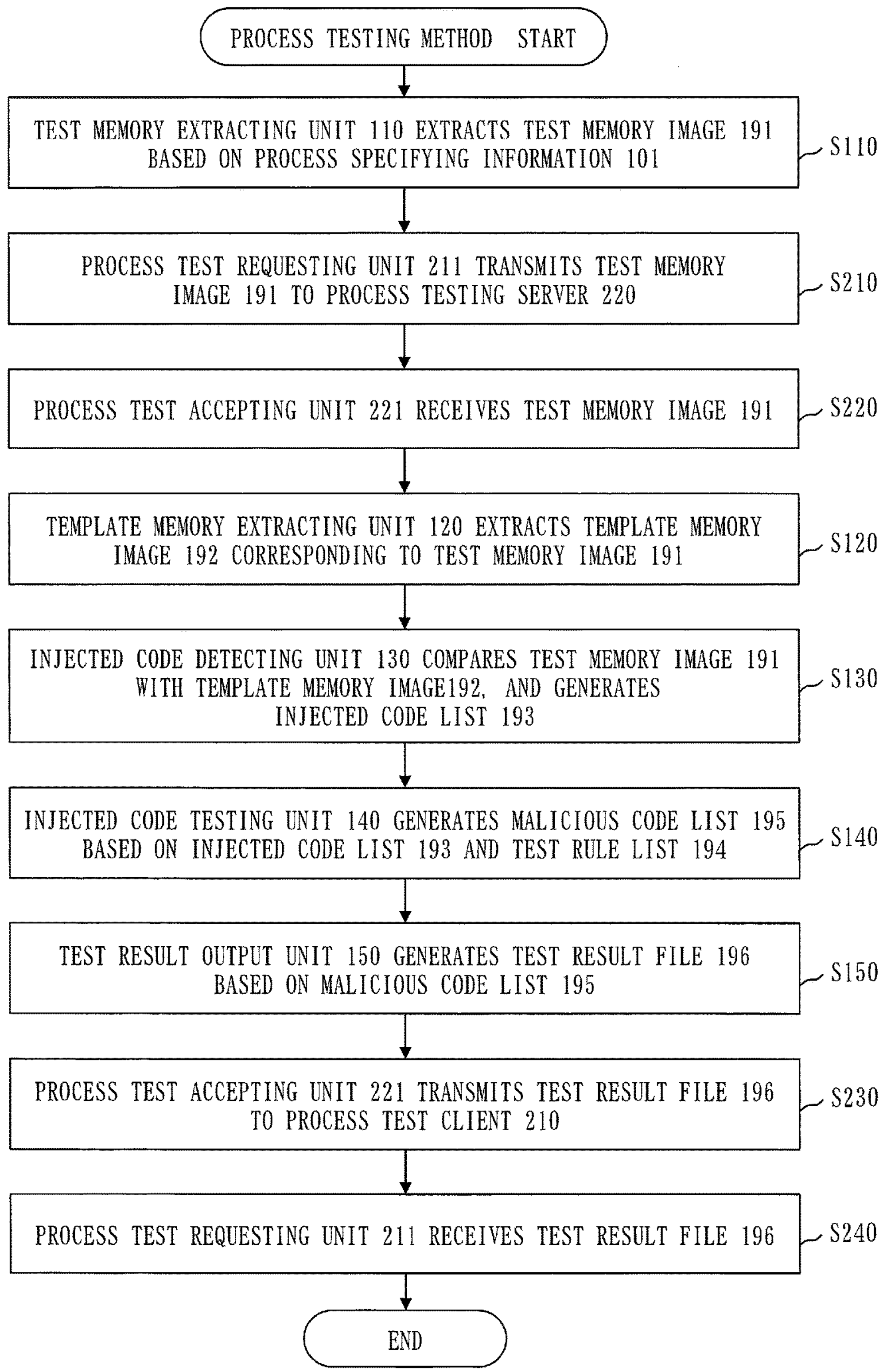
FIG. 26 is a flowchart illustrating a process testing method according to the second embodiment.

FIG. 26 is a flowchart illustrating a process testing method according to the second embodiment.

With reference to FIG. 26, the process testing method according to the second embodiment will be described.

The flowchart of FIG. 26 includes S210 through S240 in addition to the processing described in the first embodiment (see FIG. 2).

In S110, the test memory extracting unit 110 of the process test client 210 generates the test memory image 191 and the executable file information 103.

The method for generating the test memory image 191 and the method for generating the executable file information 103 are as described in the first embodiment.

After S110, the processing proceeds to S210.

In S210, the process test requesting unit 211 of the process test client 210 transmits the test memory image 191 and the executable file information 103 to the process testing server 220.

After S210, the processing proceeds to S220.

In S220, the process test accepting unit 221 of the process testing server 220 receives the test memory image 191 and the executable file information 103 from the process test client 210.

After S220, the processing proceeds to S130.

In S130 through S150, the process testing server 220 generates the test result file 196.

The method for generating the test result file 196 is as described in the first embodiment.

After S150, the processing proceeds to S230.

In S230, the process test accepting unit 221 of the process testing server 220 transmits the test result file 196 to the process test client 210.

After S230, the processing proceeds to S240.

In S240, the process test requesting unit 211 of the process test client 210 receives the test result file 196 from the process testing server 220, and outputs the received test result file 196. For example, the process test requesting unit 211 outputs the content of the test result file 196 on a display device.

After S240, the process testing method terminates.

The second embodiment allows a process test to be conducted by a remotely existing cloud (the process testing server 220). That is, processes of a plurality of the process test clients 210 can be tested by the single process testing server 220. Costs required for managing the template system can also be reduced.

For example, when the computer environment of an in-house system is standardized, processes of a plurality of computers in the in-house system can be tested by providing a single template system (the process testing server 220) in the in-house system. The computer environment signifies the version of the OS, status of applying patches, applications to be installed, and so on.

Each embodiment is an example of an embodiment of the process testing apparatus 100 and the process testing system 200.

That is, the process testing apparatus 100 and the process testing system 200 may be configured without some of the functions or components described in each embodiment.

The process testing apparatus 100 and the process testing system 200 may include functions or components not described in each embodiment.

The embodiments may be combined partially or entirely, provided that no inconsistency arises.

REFERENCE SIGNS LIST

100: process testing apparatus, 101: process specifying information, 102: executed process list, 103: executable file information, 104: install list, 110: test memory extracting unit, 111: process monitoring unit, 112: memory image extracting unit, 120: template memory extracting unit, 121: install unit, 122: process executing unit, 123: memory image extracting unit, 130: injected code detecting unit, 131: static memory area comparing unit, 132: dynamic memory area comparing unit, 138: pair list, 139: address list, 140: injected code testing unit, 150: test result output unit, 160: template system updating unit, 161: executable file list generating unit, 162: install list checking unit, 163: executable file obtaining unit, 164: install unit, 169: executable file list, 170: test rule updating unit, 180: template system control unit, 190: apparatus storage unit, 191: test memory image, 192: template memory image, 193: injected code list, 194: test rule list, 195: malicious code list, 196: test result file, 200: process testing system, 201: network, 210: process test client, 211: process test requesting unit, 219: client storage unit, 220: process testing server, 221: process test accepting unit, 229: server storage unit, 901: arithmetic device, 902: auxiliary storage device, 903: main storage device, 904: communication device, 905: input/output device, 909: bus

The invention claimed is:

1. A process testing apparatus comprising:

a processor to execute a program; and a memory to store the program which, when executed by the processor, results in performance of steps comprising obtaining a first memory image representing content of a first memory area out of a memory area of a first computer that executes an executable file, the first memory area being reserved for a first process for executing the executable file, causing a second computer, which is not infected with malware that generates a malicious program code, to execute the executable file, obtaining a second memory image representing content of a second memory area out of a memory area of the second computer, the second memory area being reserved for a second process for executing the executable file, and detecting an injected code which is a program code included in the first memory area but not included in the second memory area, based on a distance representing a similarity degree between a first list of operation codes extracted from a first dynamic memory-area out of the first memory image and a second list of operation codes extracted from a second dynamic memory area out of the second memory image.

2. The process testing apparatus according to claim 1, wherein the extracting the first list and second list of operation codes comprises generating a first executable block list of executable blocks which are continuous memory areas for which execution is allowed from the first dynamic memory area, generating a second executable block list of executable blocks which are continuous memory areas for which execution is allowed from the second dynamic memory area, generating the first list of operation codes by extracting operation codes from each executable block in the first executable block list, generating the second list of operation codes by extracting operation codes from each executable block in the second executable block list, calculating a distance between each pair of the first list of operation codes and the second list of operation codes, identifying a non-similar executable block which is a executable block from the first executable block list that is not similar to any of the executable blocks from the second executable block list, based on the distance between each pair of the first list of operation codes and the second list of operation codes, and determining that a program code stored in the identified non-similar executable block is the injected code.

3. The process testing apparatus according to claim 2, wherein the distance between each pair of the first list of operation codes and the second list of operation codes is a Hamming distance or a Levenshtein distance.

4. The process testing apparatus according to claim 1, wherein a port number is specified as information for identifying the first process, and the program results in performance of steps comprising identifying a process that uses a port identified with the specified port number as the first process.

5. The process testing apparatus according to claim 1, wherein the program results in performance of steps comprising, when a first executable file installed on the first computer as the executable file and a second executable file installed on the second computer as the executable file are not identical, installing an executable file that is identical to the first executable file on the second computer.

6. The process testing apparatus according to claim 5, wherein the program results in performance of steps comprising, when at least any one of a name, a version, a path, and a message digest of the second executable file is different from the first executable file, determining that the first executable file and the second executable file are not identical.

7. The process testing apparatus according to claim 1, wherein the program results in performance of steps comprising testing whether or not the injected code is the malicious program code based on a test rule indicating a condition for the malicious program code.

8. The process testing apparatus according to claim 1, wherein the second computer is a virtual machine.

9. A non-transitory computer readable medium having stored thereon a process testing program for causing a computer to execute the steps of:

obtaining a first memory image representing content of a first memory area out of a memory area of a first computer that executes an executable file, the first memory area being reserved for a first process for executing the executable file;

obtaining a second computer, which is not infected with malware that generates a malicious program code, to execute the executable file, and obtaining a second memory image representing content of a second memory area out of a memory area of the second computer, the second memory area being reserved for a second process for executing the executable file; and detecting an injected code which is a program code included in the first memory area but not included in the second memory area, based on a distance representing a similarity degree between a first list of operation codes extracted from a first dynamic memory area out of the first memory image and a second list of operation codes extracted from a second dynamic memory area of the second memory image.

10. A process testing method comprising:

obtaining a first memory image representing content of a first memory area out of a memory area of a first computer that executes an executable file, the first memory area being reserved for a first process for executing the executable file;

causing a second computer, which is not infected with malware that generates a malicious program code, to execute the executable file, and obtaining a second memory image representing content of a second memory area out of a memory area of the second computer, the second memory area being reserved for a second process for executing the executable file; and detecting an injected code which is a program code included in the first memory area but not included in the second memory area, based on a distance representing a similarity degree between a first list of operation codes extracted from a first dynamic memory area out of the first memory image and a second list of operation codes extracted from a second dynamic memory area out of the second memory image.

* * * * *